(12) United States Patent
Tojo

(10) Patent No.: US 8,400,690 B2
(45) Date of Patent: Mar. 19, 2013

(54) APPARATUS AND METHOD FOR DETECTING AND COMPENSATING FOR MULTI-FED DOCUMENT SCANNING ERRORS

(75) Inventor: Yuki Tojo, Osaka (JP)

(73) Assignee: KYOCERA Document Solutions Inc. (JP)

( * ) Notice: Subject to any disclaimer, the term of this patent is extended or adjusted under 35 U.S.C. 154(b) by 318 days.

(21) Appl. No.: 12/879,187

(22) Filed: Sep. 10, 2010

(65) Prior Publication Data

US 2011/0069359 A1  Mar. 24, 2011

(30) Foreign Application Priority Data

Sep. 18, 2009  (JP) ................................ 2009-216625

(51) Int. Cl.
| | | |
|---|---|---|
| *H04N 1/04* | (2006.01) | |
| *H04N 1/40* | (2006.01) | |
| *G06F 15/00* | (2006.01) | |
| *B65H 5/00* | (2006.01) | |
| *G03G 15/00* | (2006.01) | |

(52) U.S. Cl. ...... 358/498; 358/1.6; 358/470; 271/10.01; 399/21

(58) Field of Classification Search .................. 358/498, 358/1.6, 470; 271/10.01; 399/21
See application file for complete search history.

(56) References Cited

U.S. PATENT DOCUMENTS

| 2007/0090586 A1 | 4/2007 | Ohnishi et al. |
| 2007/0195378 A1* | 8/2007 | Yoshida ......................... 358/470 |
| 2008/0174793 A1* | 7/2008 | Mutsuno ........................ 358/1.6 |
| 2008/0298821 A1* | 12/2008 | Mori ............................... 399/21 |
| 2012/0161382 A1* | 6/2012 | Morinaga et al. .......... 271/10.01 |

FOREIGN PATENT DOCUMENTS

| JP | 1996-085647 | 4/1996 |
| JP | 2001-273478 | 10/2001 |
| JP | 2005-244425 | 9/2005 |
| JP | 2007-114589 | 5/2007 |
| JP | 2007-228184 | 9/2007 |
| JP | 2008-193470 | 8/2008 |

* cited by examiner

*Primary Examiner* — Charlotte M Baker
*Assistant Examiner* — Rury Grisham
(74) *Attorney, Agent, or Firm* — McDonnell Boehnen Hulbert & Berghoff LLP

(57) ABSTRACT

An image reading apparatus includes a document tray, first and second output trays, first and second conveyance paths, a conveying roller, a switch unit that changes a destination of documents to one of the first and second conveyance paths, a multi-feed determination unit that determines whether the documents are in a multi-fed state (e.g., a state in which a plurality of documents are layered on one another), a reading unit that acquires image data, an image storage unit that stores the image data, a control unit that controls the switch unit, and a multi-feed image storage unit that stores image data acquired by re-reading the multi-fed documents, as multi-feed image data. The control unit assigns information of page order of the documents to the image data stored in the image storage unit.

20 Claims, 16 Drawing Sheets

APPARATUS AND METHOD FOR DETECTING AND COMPENSATING FOR MULTI-FED DOCUMENT SCANNING ERRORS

CROSS-REFERENCE TO RELATED APPLICATIONS

This application is based upon and claims the benefit of priority from the corresponding Japanese Patent application No. 2009-216625, filed in the Japan Patent Office on Sep. 18, 2009, the entire contents of which are incorporated herein by reference.

BACKGROUND

1. Field of the Invention

The present disclosure relates to an image reading apparatus that automatically conveys a document, reads an image on the document during the conveyance, and acquires image data, and also relates to an image forming apparatus including the image reading apparatus.

2. Description of the Related Art

In recent years, a known image reading/forming apparatus includes a document tray provided with an automatic document feeder (ADF) that automatically conveys documents from the tray, and an image sensor that reads the documents while the ADF successively conveys the documents. The ADF takes in the documents from the document tray one by one, and conveys the documents through a conveyance path. The image sensor is positioned to face the conveyance path, and reads an image from each respective document while the respective document passes through the conveyance path. After the image on the document is read, it is output to an output tray. The ADF of the related art is capable of detecting an occurrence of multi-feeding, e.g., a situation in which two or more documents are conveyed, and if multi-feeding is detected, is capable of stopping a conveying operation and an image reading operation of the document by the ADF.

For example, in a first case, it may be assumed that a user places a large amount of documents on the document tray, starts the image reading operation, and then leaves the image reading apparatus. In this case, when the ADF of the related art detects multi-feeding during the image reading operation, the ADF stops the image reading operation. Owing to this, although the user may return to expect that the image reading operation has completed, when the user returns to the image reading apparatus, the image reading operation, in fact, may not be completed. Rather, the user has to re-start the image reading operation from the start or from a page where the multi-feeding occurred. This is troublesome work and takes up unnecessary time.

SUMMARY

An object of the present disclosure is to provide an image reading apparatus and an image forming apparatus including the image reading apparatus, which reduces and/or eliminates the troublesome work of a user when multi-feeding of documents has occurred, and decreases a time for re-starting the reading operation for the multi-fed documents.

An image reading apparatus according to an aspect of the present disclosure includes a document tray, first and second output trays, first and second conveyance paths, a conveying roller, a switch unit, a multi-feeding determination unit, a reading unit, an image storage unit, a control unit, and a multi-feeding image storage unit. The switch unit changes document destination to one of the first and second conveyance paths. The multi-feeding determination unit determines whether the documents are in a multi-fed state, e.g., a state in which a plurality of documents are layered on one another. The reading unit acquires image data from the documents as they pass through the first conveyance path. The image storage unit stores the image data. The control unit controls the switch unit. The multi-feeding image storage unit stores image data, as accumulated multi-feeding image data, acquired by re-reading the multi-fed documents. The control unit assigns document page order information to the image data stored in the image storage unit and to the multi-feeding image data stored in the multi-feeding image storage unit.

An image forming apparatus according to another aspect of the present disclosure includes the aforementioned image reading apparatus, and an image forming unit. The image forming unit forms images on sheets depending on the image data stored in the image storage unit.

Further features and advantages will be described in more detail below with reference to the attached drawings.

DETAILED DESCRIPTION

First Embodiment

Figure 1:
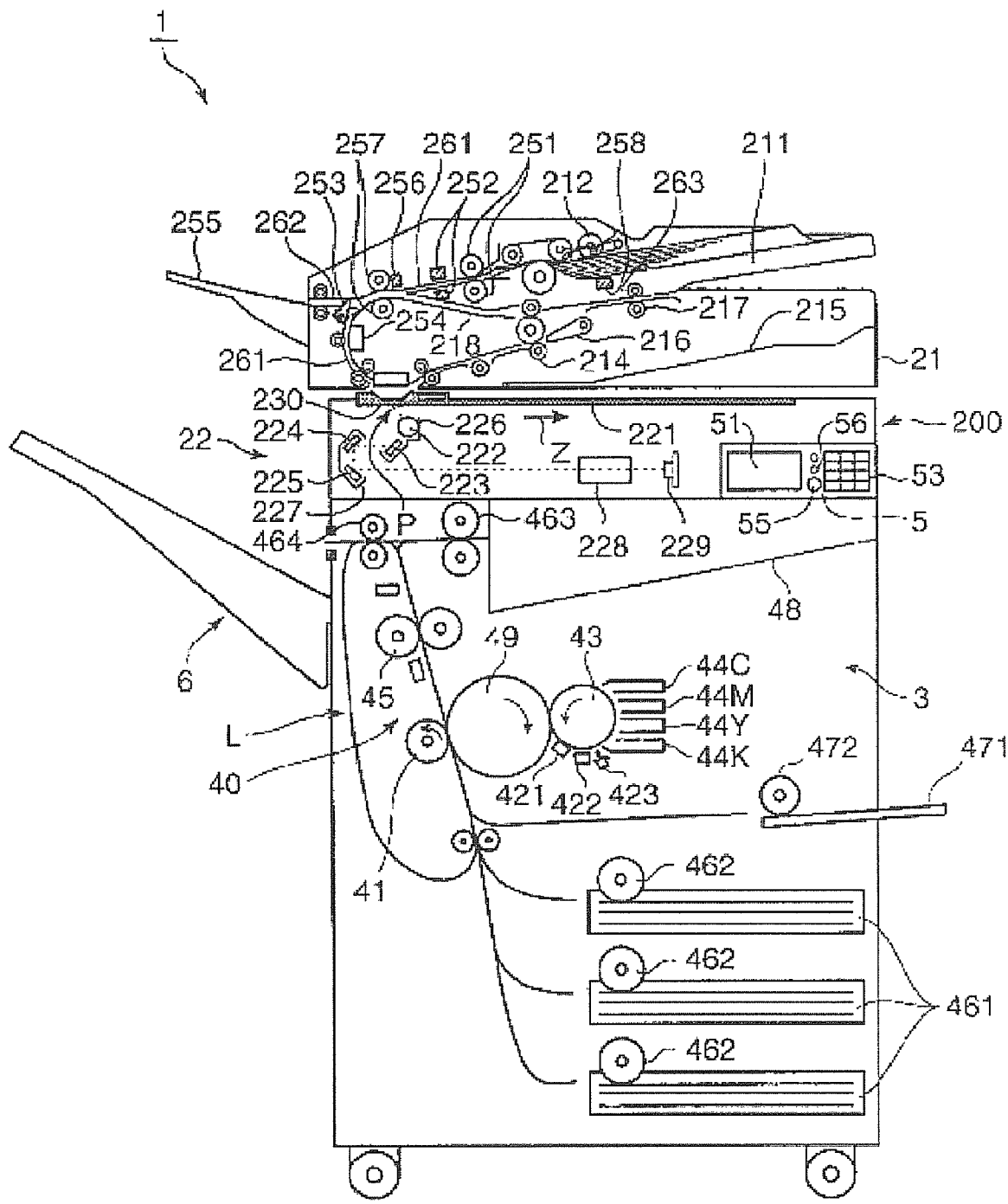
FIG. 1 is a longitudinal section schematically showing an inner configuration of an image forming apparatus according to a first embodiment of the disclosure.

An image reading apparatus and an image forming apparatus according to a first embodiment of the disclosure will be described with reference to the attached drawings. In this embodiment, for example, a multifunction peripheral (MFP) having functions of a color copier, a scanner, a facsimile, and a printer is described. FIG. 1 is a longitudinal sectional view schematically showing an inner configuration of an image forming apparatus 1 according to the first embodiment.

The image forming apparatus 1 includes a document reading mechanism 200 and an apparatus body 3. The document reading mechanism 200 includes a document conveying unit 21, a scanner unit (reading unit) 22, an input operation unit 5, and a reversal mechanism (described later). The document conveying unit 21 is an ADF including a document tray 211, a pickup roller 212, a conveying roller pair 251, a first conveyance path 261, a registration roller pair 257, a sheet-output roller 214, and a first output tray 215. Documents to be read are placed on the document tray 211.

The document tray 211 is a tray on which documents to be read are placed. A document tray sensor 258 is provided at a bottom portion of the document tray 211. The document tray sensor 258 is a sensor that detects the presence of the documents on the document tray 211, and outputs a detection signal to a control unit (described later). The pickup roller 212 takes in the documents placed on the document tray 211, one by one. The conveying roller pair 251 divides the documents such that the documents are successively fed to the first conveyance path 261, one by one with a space provided between the documents.

A registration sensor 256 detects the presence of the documents passing through the first conveyance path 261, and outputs a detection signal to the control unit. The control unit gives an instruction corresponding to the detection signal. In response to the instruction, the registration roller pair 257 adjusts conveyance timing, and the documents are conveyed out to a contact image sensor (CIS) 254 or the scanner unit 22. The CIS 254 or the scanner unit 22 reads images on the documents. The sheet-output roller 214 successively outputs the documents onto the first output tray 215.

Also, an ultrasonic sensor 252 is disposed downstream of the conveying roller pair 251 in a document conveyance direction. The ultrasonic sensor 252 detects multi-feeding of the documents. The ultrasonic sensor 252 includes a transmitting unit that transmits ultrasonic waves, and a receiving unit that receives ultrasonic waves. The transmitting unit and the receiving unit are arranged to face one another with the first conveyance path 261 interposed therebetween. That is, the documents that have passed through the conveying roller pair 251 pass through a position between the transmitting unit and the receiving unit.

The transmitting unit of the ultrasonic sensor 252 irradiates a document with ultrasonic waves in a direction orthogonal to the document. The ultrasonic waves, with which the document is irradiated, are attenuated when the ultrasonic waves are transmitted through the document. The receiving unit receives an ultrasonic signal of the ultrasonic waves after the ultrasonic waves have been transmitted through the document. The receiving unit converts the ultrasonic signal into an electric signal, and outputs the electric signal to the control unit. The control unit uses the electric signal to calculate a transmittance. The control unit determines whether multi-feeding has occurred on the basis of the transmittance. In this embodiment, the ultrasonic sensor is described as an example. However, the sensor may be any sensor as long as the sensor can detect multi-feeding of the documents.

A second conveyance path 262 is provided downstream of the ultrasonic sensor 252 in the document conveyance direction. The second conveyance path 262 is branched from the first conveyance path 261. A branch guide (switch unit) 253 is disposed at a branch point for the second conveyance path 262. When the branch guide 253 is located at a position indicated by a solid line, the document is directly guided to the first conveyance path 261. Hereinafter, the position indicated by the solid line of the branch guide 253 is called "regular position." When the branch guide 253 is located at a position indicated by a dotted line, the document is guided from the first conveyance path 261 to the second conveyance path 262, and is output onto a second output tray 255. Hereinafter, the position indicated by the dotted line of the branch guide 253 is called "multi-feeding conveyance position."

Normally, the branch guide 253 is located at the regular position, and guides the document to the first conveyance path 261. When the control unit determines that multi-feeding has occurred, perhaps on the basis of the signal sent from the ultrasonic sensor 252, the control unit changes the position of the branch guide 253 to the multi-feeding conveyance position. Since the position of the branch guide 253 is changed to the multi-feeding conveyance position, the documents in the multi-fed state are guided to the second conveyance path 262, and output onto the second output tray 255 before the scanner unit 22 or the CIS 254 performs the image reading operation.

The scanner unit 22 optically reads an image on a document and generates image data. The scanner unit 22 includes a platen glass 221, a light source 222, a first mirror 223, a second mirror 224, a third mirror 225, a first carriage 226, a second carriage 227, an imaging lens 228, and a charge coupled device (CCD) 229. The light source 222 that is provided in the scanner unit 22 and irradiates a document with light uses a plurality of light emitting diodes (LEDs) arrayed in a main-scanning direction. The first mirror 223, the second mirror 224, the third mirror 225, the first carriage 226, the second carriage 227, and the imaging lens 228 guide reflected light, which is reflected from the document, to the CCD 229.

For an image reading operation for documents without using the document conveying unit 21, a user may manually place a document on the platen glass 221. The first carriage 226 supports the light source 222 and the first mirror 223. The second carriage 227 supports the second mirror 224 and the third mirror 225.

A document reading mode of the document reading mechanism 200 includes a flat bed reading mode, in which the scanner unit 22 reads a document placed on the platen glass 221, and an ADF reading mode, in which the document conveying unit 21 (ADF) takes in a document, and the scanner unit 22 reads the document while the document is being conveyed.

In the flat bed reading mode, the light source 222 irradiates a document placed on the platen glass 221 with light, the reflected light from the document for a single line in the main-scanning direction being reflected by the first mirror 223, the second mirror 224, and the third mirror 225 in that order, and the light becoming incident on the imaging lens 228. The light incident on the imaging lens 228 is focused onto a light-receiving surface of the CCD 229. The CCD 229 is a one-dimensional image sensor. The CCD 229 processes image data of the document simultaneously for a single line extending in the main-scanning direction. The first carriage 226 and the second carriage 227 are movable in a direction orthogonal to the main-scanning direction (i.e., a sub-scanning direction, or a direction indicated by an arrow Z in FIG. 1). After the reading operation for the single line is ended, the first carriage 226 and the second carriage 227 are moved in the sub-scanning direction, and the CCD performs the reading operation for a next line of the document.

In the ADF reading mode, the document conveying unit 21 takes in documents placed on the document tray 211 one by one by using the pickup roller 212. At this time, the first carriage 226 and the second carriage 227 are arranged at a reading position P located blow a reading window 230 that is made of a transparent material such as a glass member. When a document is conveyed by the document conveying unit 21 and when the document passes through a position above the reading window 230 that is provided along the first conveyance path 261 to the first output tray 215, the light source 222 irradiates the document with light, the reflected light from the document for a single line in the main-scanning direction is reflected by the first mirror 223, the second mirror 224, and the third mirror 225 in that order, and the reflected light becomes incident on the imaging lens 228. The reflected light incident on the imaging lens 228 is then focused on the light-receiving surface of the CCD 229 by the lens 228. Then, the document is conveyed by the document conveying unit 21, and a next line of the document is read.

In addition, the image forming apparatus 1 allows the CCD 229 to read the front side of the document and also allows the CIS 254 to read the back side of the document while the document is conveyed in the ADF reading mode. In particular, the CCD 229 reads the front side of the document when the document fed from the document tray 211 passes through the position above the reading window 230, and the CIS 254 reads the back side of the document when the document passes the CIS 254. In this way, by using the CCD 229 and the CIS 254, both sides of the document can be read by the single conveyance.

Further, the document conveying unit 21 includes a document reversal mechanism including a switch guide 216, a switch-back roller pair 217, and a reversal conveyance path 218. The document reversal mechanism reverses the document, the front side of which has been read by the first reading operation in the ADF reading mode, and conveys again the document to the upstream side in the document conveyance direction with respect to the reading window 230 in the first conveyance path 261. Thus, the CCD 229 performs the reading operation for the back side of the document. The document reversal mechanism is activated only in a duplex reading mode, but not activated when a one-sided reading mode.

In the duplex reading mode, when the CCD 229 ends the reading operation for the front side of the document, the position of the switch guide 216 is changed to the lower side, and the document, which has passed through the first conveyance path 261, is sent to a switch-back conveyance path 263. Then, the position of the switch guide 216 is changed to the upper side. The switch-back roller pair 217 nips the document, which has been guided to the switch-back conveyance path 263, while a part of the document is output to the outside of the document conveying unit 21. The switch-back roller pair 217 rotates backward, and switches back the document to the reversal conveyance path 218. The document is fed from the switch-back conveyance path 263 through the reversal conveyance path 218 to the first conveyance path 261. The CCD 229 reads the back side of the document.

In the one-sided reading mode or the duplex reading mode, after the CCD 229 reads the one side of the document, the position of the switch guide 216 is changed to the upper side. The sheet-output roller 214 outputs the document, the image of which has been read, onto the first output tray 215.

The apparatus body 3 includes a stack tray 6 disposed at the left side of the apparatus body 3. The apparatus body 3 includes a plurality of sheet-feed cassettes 461, a plurality of sheet-feed rollers 462, and an image forming unit 40. Each of the sheet-feed rollers 462 picks up sheets from the corresponding sheet-feed cassette 461 one by one, and conveys the sheets to the image forming unit 40. The image forming unit 40 forms images on the sheets conveyed from the sheet-feed cassette 461. The apparatus body 3 also includes a manual feed tray 471 and a pickup roller 472 that picks up sheets stacked on the manual feed tray 471 one by one to the image forming unit 40.

The image forming unit 40 includes a charge-eliminating device 421 that eliminates a remnant change on a surface of a photosensitive drum 43; a charging device 422 that then charges the surface of the photosensitive drum 43; an exposing device 423 that exposes the surface of the photosensitive drum 43 with laser light output in a manner corresponding to image data acquired by the scanner unit 22, and forms electrostatic latent images on the surface of the photosensitive drum 43; developing devices 44C, 44M, 44Y, and 44K that then form toner images of respective colors including cyan (C), magenta (M), yellow (Y), and black (K), on the photosensitive drum 43 on the basis of the electrostatic latent images; a transfer drum 49 that then receives the toner images of the respective colors formed on the photosensitive drum 43 so that the toner images are superposed on one another on the transfer drum 49; a transferring device 41 that transfers the toner images on the transfer drum 49 onto a sheet; and a fixing device 45 that heats the sheet with the toner images transferred thereon and fixes the toner images to the sheet. Toners of respective colors are supplied from toner supply containers (toner cartridges, not shown). In addition, conveying roller pairs 463 and 464 etc. are provided to convey the sheets, which have passed through the image forming unit 40, to the stack tray 6 or to an output tray 48.

When images are formed on both sides of a sheet, the image forming unit 40 forms an image on the front side of the sheet, then the conveying roller pair 463 located near the output tray 48 nips the sheet, and then the conveying roller pair 463 rotates backward to switch back the sheet. The sheet is conveyed to a sheet-conveyance path L, and is conveyed again to the upstream side in a sheet conveyance direction with respect to the image forming unit 40. The image forming unit 40 then forms an image on the back side of the sheet. Then, the sheet is output to the stack tray 6 or to the output tray 48.

Further, the apparatus body 3 includes a display 51, with which the user may visually recognize an operation screen, various messages, etc.; and the input operation unit 5 including operation buttons for inputting various operation commands, such as a numerical keypad 53, with which the user inputs, for example, the number of sheets to be printed, a start key 55, with which the user gives an instruction to start various operations, and a stop key 56, with which the user gives an instruction to stop the various operations. The display 51 is formed of a liquid crystal display (LCD) or an electronic luminescent display (ELD), and displays, for example, setting screens and messages for the user.

Figure 2:
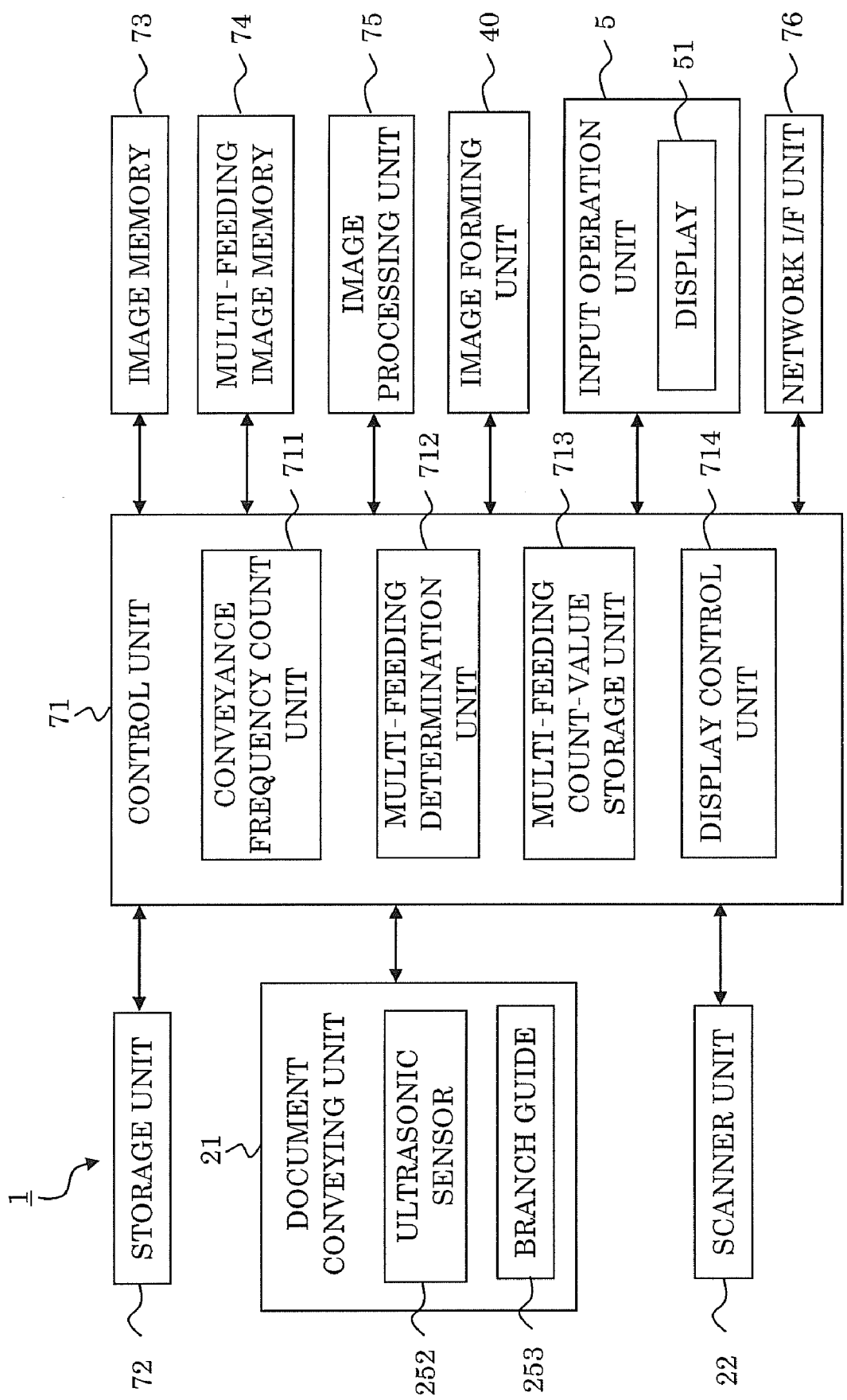
FIG. 2 is a block diagram showing an electrical configuration of the image forming apparatus according to the first embodiment of the disclosure.

FIG. 2 is a block diagram showing an electrical configuration of the image forming apparatus 1. The image forming apparatus 1 includes a control unit 71, a storage unit 72, the document conveying unit 21, the scanner unit 22, an image memory (image storage unit) 73, a multi-feeding image memory (multi-feeding image storage unit) 74, an image processing unit 75, the image forming unit 40, the input operation unit 5, and a network I/F unit 76. The same numerals are used for the components which have been described with reference to FIG. 1, and redundant descriptions are omitted.

The storage unit 72 stores a program, data, etc., for providing various functions of the image forming apparatus 1. The image memory 73 temporarily stores image data acquired by the CIS 254 and/or the CCD 229, and image data sent from an external device via the network I/F unit 76.

The multi-feeding image memory 74 stores accumulated multi-fed image data, which is acquired when multi-fed documents are placed on the document tray 211 again and images on the documents are read by the CIS 254 or the CCD 229. In this embodiment, the image forming apparatus 1 includes the image memory 73 and the multi-feeding image memory 74. However, the image memory 73 and the multi-feeding image memory 74 may be formed of a single memory.

The image processing unit 75 performs image processing for the image data stored in the image memory 73, for example, by correcting an image, and/or reducing or enlarging an image. The network I/F unit 76 is formed of a communication module such as a LAN board, and sends and receives various data to and from an external device that is connected with the network I/F unit 76 via a network (not shown).

The control unit 71 is formed of a central processing unit (CPU) or the like. The control unit 71 reads a program stored in the storage unit 72 and executes processing corresponding to the program. For example, the control unit 71 outputs an instruction signal and transfers data to each function portion, to generally control the image forming apparatus 1. The control unit 71 includes a conveyance frequency count unit (count unit) 711, a multi-feeding determination unit 712, a multi-feeding count-value storage unit 713, and a display control unit 714.

The conveyance frequency count unit 711 counts the number of times the conveying roller pair 251 conveys documents from the document tray 211 to the first conveyance path 261. In particular, an optical sensor or a mechanical sensor that detects the passage of the document is provided near the conveying roller pair 251. The conveyance frequency count unit 711 may perform counting by using a detection signal output from the sensor, or by using a detection signal output from the registration sensor 256.

The multi-feeding determination unit 712 determines whether documents are multi-fed depending on a detection signal output from the receiving unit of the ultrasonic sensor 252. When the multi-feeding determination unit 712 determines that multi-feeding of documents has occurred, the control unit 71 stops the image reading operation for the multi-fed documents, which pass through the scanner unit 22, and changes the position of the branch guide 253 to the multi-feeding conveyance position such that the multi-fed documents are conveyed to the second conveyance path 262. Then, the control unit 71 changes the position of the branch guide 253 to the regular position after the registration sensor 256 detects rear edges of the multi-fed documents and outputs a detection signal.

The multi-feeding count-value storage unit 713 stores a count value of the conveyance frequency count unit 711 when the multi-feeding determination unit 712 determines that the documents are multi-fed. For example, if the multi-feeding determination unit 712 determines that the multi-feeding of the documents has occurred when the count value by the conveyance frequency count unit 711 is 10, the multi-feeding count-value storage unit 713 stores "10." Also, if the multi-feeding determination unit 712 determines that the multi-feeding of the documents has occurred when the count value by the conveyance frequency count unit 711 is 20, the multi-feeding count-value storage unit 713 stores "20." The multi-feeding count-value storage unit 713 may be preferably a memory or a register of a first-in first-out (FIFO) type.

The display control unit 714 causes the display 51 to display a setting screen, a message for the user, etc. For example, when the multi-feeding determination unit 712 determines that multi-feeding of documents has occurred, the display control unit 714 causes the display 51 to display a message for notifying the user that multi-feeding of documents has occurred. A specific display example will be described later.

Figure 3:
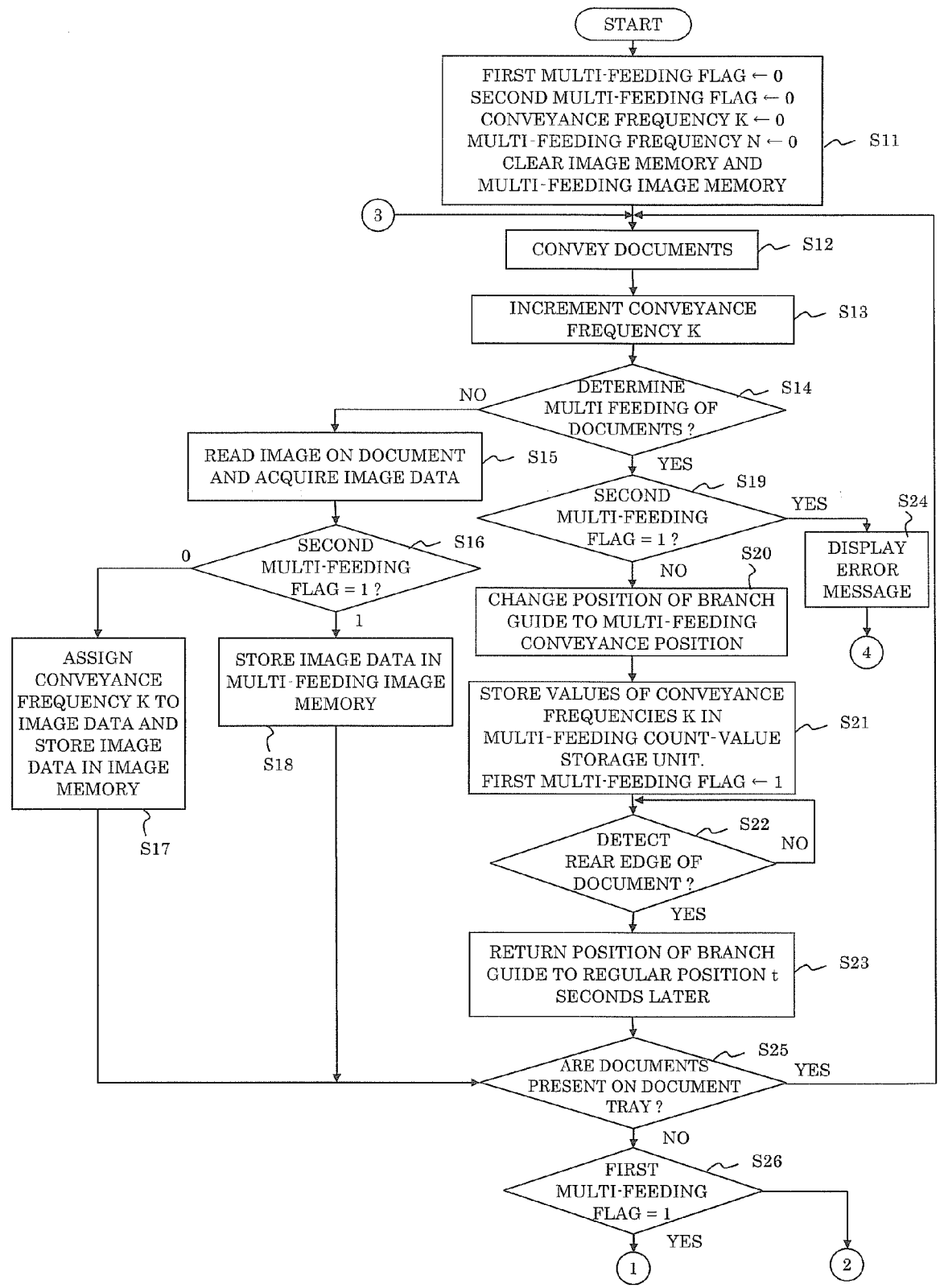
FIG. 3 is a flowchart showing a flow of processing from an image reading operation for documents to an image forming operation according to the first embodiment of the disclosure.
Figure 4:
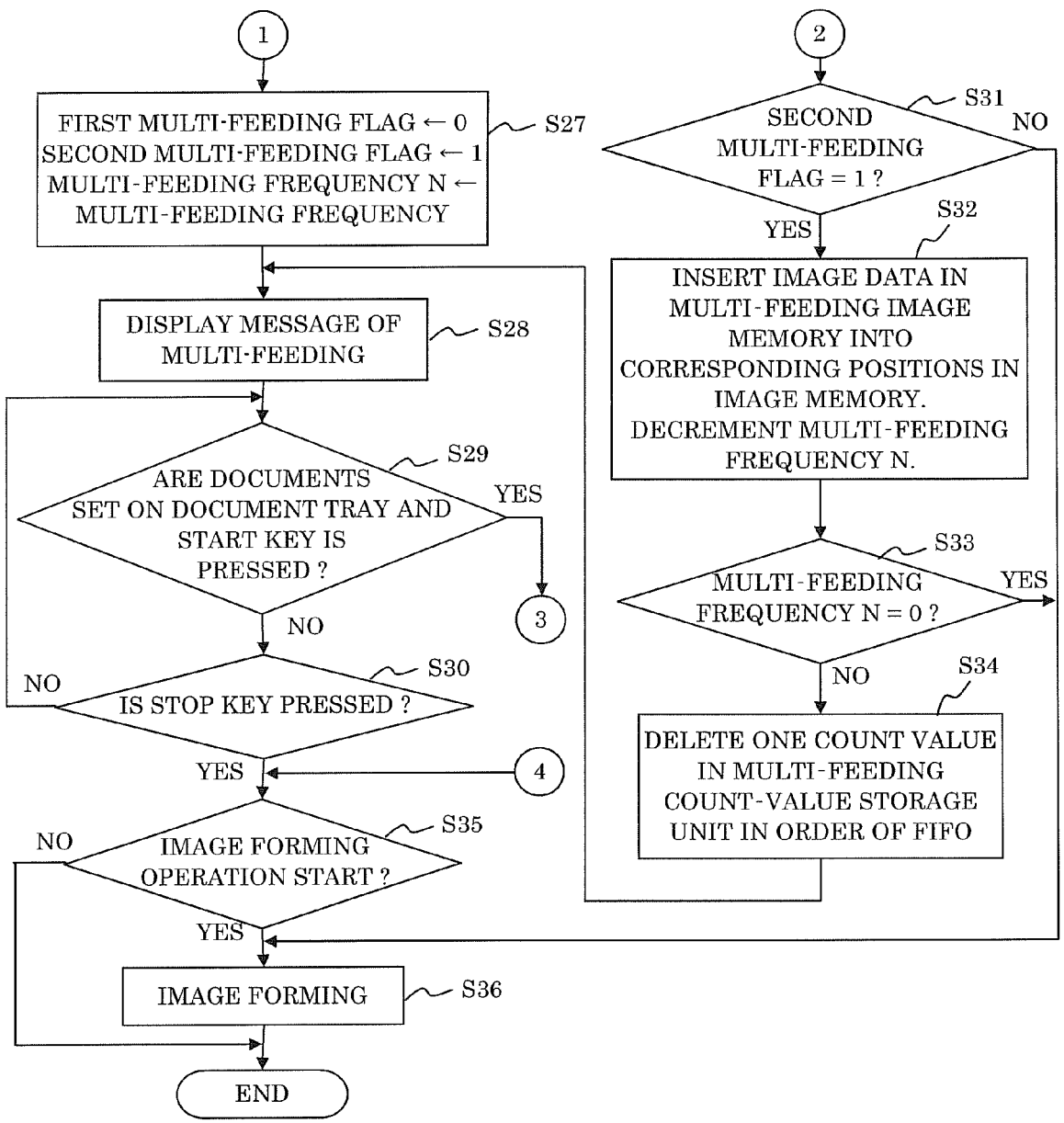
FIG. 4 is a flowchart showing the flow of the processing from the image reading operation to the image forming operation, the flow being continued from the flow in FIG. 3.

Next, a flow of processing from an image reading operation for documents to an image forming operation will be described with reference to flowcharts and figures. FIGS. 3 and 4 are flowcharts showing the flow of the processing from the image reading operation to the image forming operation. In this embodiment, the flow of the processing from the image reading operation to the image forming operation in one-sided reading mode is described. However, duplex reading can be implemented by similar processing in a duplex reading mode.

A variable that is used by the control unit 71 will be described first. A first multi-feeding flag and a second multi-feeding flag are flag variables each having a value of 0 or 1. An initial value of the first multi-feeding flag is "0." The control unit 71 rewrites the initial value to "1" when the multi-feeding determination unit 712 detects an occurrence of multi-feeding. An initial value of the second multi-feeding flag is "0." The control unit 71 rewrites the initial value to "1" when the multi-fed documents are placed again on the document tray 211 and the image reading operation is performed for the documents. A conveyance frequency (the number of times documents are conveyed) K indicates a count value of the conveyance frequency count unit 711. A multi-feeding frequency N indicates the number of times the multi-feeding of the documents has occurred.

When documents are placed on the document tray 211, and the control unit 71 receives a press signal of the start key 55, the control unit 71 sets the values of the first and second multi-feeding flags, the conveyance frequency K, and the multi-feeding frequency N to "0," and also clears the stored contents of the image memory 73 and the multi-feeding image memory 74 (step S11). Also, the control unit 71 changes the position of the branch guide 253 to the regular position.

Then, the various conveying rollers, such as the pickup roller 212 and the conveying roller pair 251, convey the documents placed on the document tray 211 one by one to the first conveyance path 261 (step S12). As the registration sensor 256 outputs a detection signal indicative of the passage of each document, the conveyance frequency count unit 711 increments the conveyance frequency K (step S13).

If the multi-feeding determination unit 712 determines that the multi-feeding of the documents does not occur (step S14; NO), the CCD 229 reads an image from the document, and acquires image data (step S15). If "second multi-feeding flag=0" (step S16; "0"), the control unit 71 assigns the conveyance frequency K to the image data acquired by the CCD 229 and then stores the image data in the image memory 73 (step S17). A situation of "second multi-feeding flag=1" (step S16; "1") will be described later.

Figure 5:
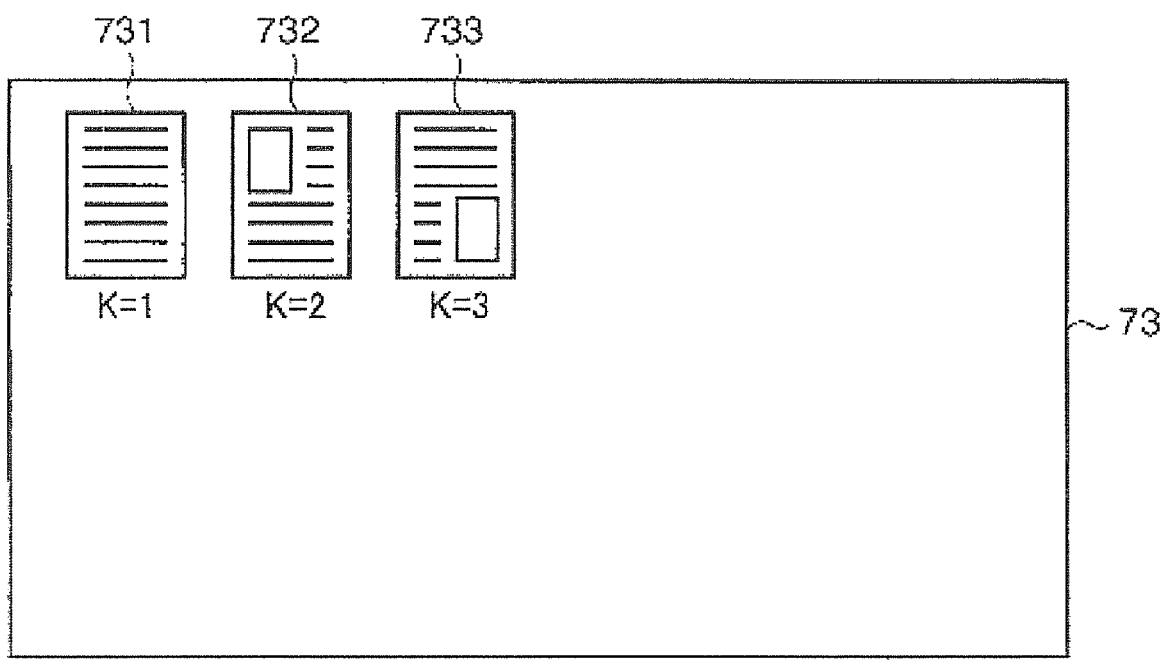
FIG. 5 illustrates an exemplary data configuration of an image memory according to the first embodiment of the disclosure.

FIG. 5 illustrates an exemplary data configuration of the image memory 73. If the multi-feeding does not occur when three documents have been read, the image memory 73 stores image data 731, 732, and 733 for the three documents. The image memory 73 also assigns values of the conveyance frequencies K when the respective image data is acquired, to the respective image data. If the documents are present on the document tray 211 (step S25; YES), the control unit 71 shifts the processing to step S12. The control unit 71 determines the presence of the documents on the document tray 211 by using a detection signal from the document tray sensor 258.

In step S14, if the multi-feeding determination unit 712 determines that the multi-feeding of the documents has occurred (step S14; YES), and if "second multi-feeding flag=0" (step S19; NO), the control unit 71 changes the position of the branch guide 253 to the multi-feeding conveyance position (step S20), the multi-feeding count-value storage unit 713 stores the values of the conveyance frequencies K, and the first multi-feeding flag is set to "1" (step S21). If the registration sensor 256 has output a detection signal resulting from the detection of the rear edge of the document (step S22; YES), when a predetermined number t seconds (t is an integer greater than 0) has elapsed, the control unit 71 returns the position of the branch guide 253 to the regular position (step S23). If the documents are present on the document tray 211 (step S25; YES), the control unit 71 shifts processing to step S12.

Figure 6:
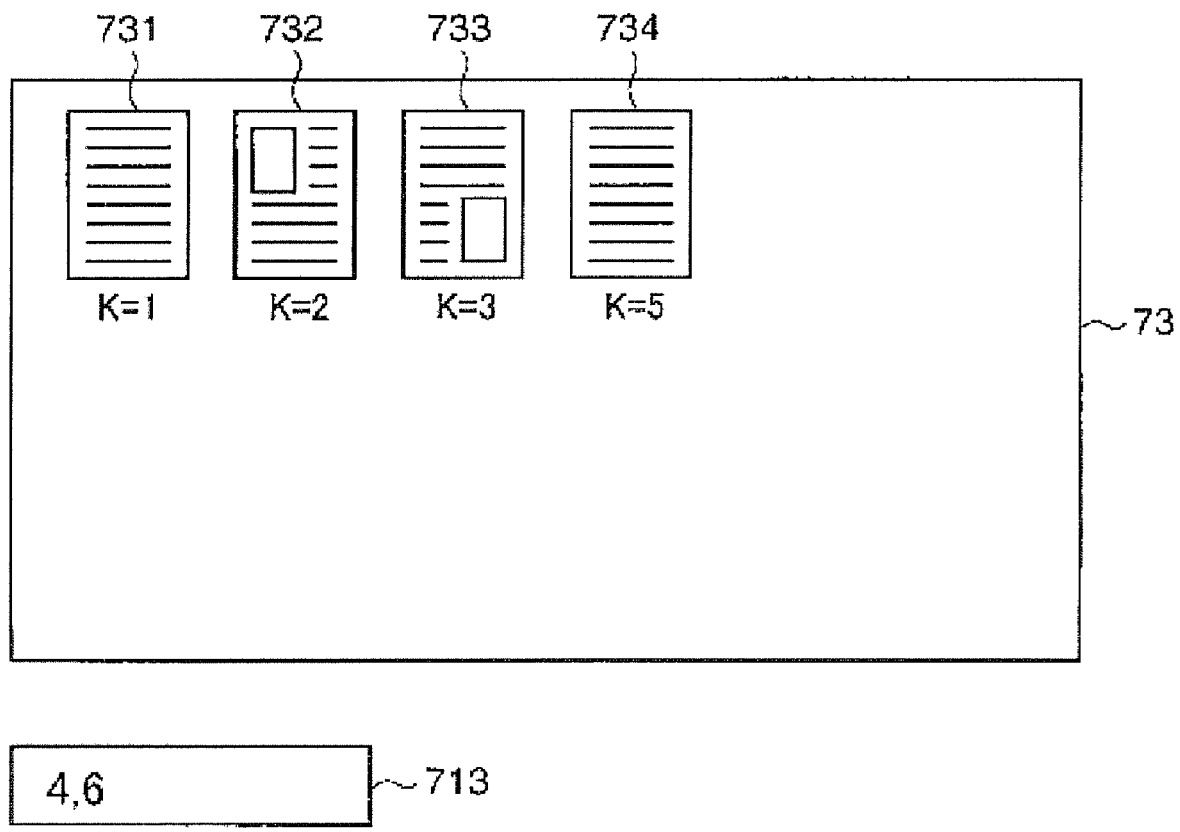
FIG. 6 illustrates an exemplary data configuration of the image memory and a multi-feeding count-value storage unit according to the first embodiment of the disclosure.

FIG. 6 illustrates an exemplary data configuration of the image memory 73 and the multi-feeding count-value storage unit 713 after all the documents placed on the document tray 211 are conveyed. It is assumed that the registration sensor 256 detects the document conveyance six times in total, and the multi-feeding determination unit 712 determines that the multi-feeding has occurred at the fourth conveyance and the sixth conveyance. In this case, the image memory 73 stores image data acquired by the CCD 229 at the first to third, and fifth conveyance. In contrast, at the fourth and sixth conveyance, the control unit 71 stops the image reading operation by the scanner unit 22 because of the occurrence of the multi-feeding. The image memory 73 does not store image data of the documents conveyed this time. Instead, the multi-feeding count-value storage unit 713 stores values of "4" and "6." If the multi-feeding determination unit 712 does not make the determination on the occurrence of the multi-feeding, the image memory 73 stores image data for all documents, and the multi-feeding count-value storage unit 713 does not have a value to be stored.

If no document is present on the document tray 211, that is, if all documents placed on the document tray 211 are conveyed (step S25; NO); if "first multi-feeding flag=0," that is, if the multi-feeding determination unit 712 does not make the determination on the occurrence of the multi-feeding (step S26; NO); and if "second multi-feeding flag=0" (step S31; NO), the control unit 71 causes the image forming unit 40 to form images on sheets corresponding to the image data stored in the image memory 73 (step S36), and processing is ended.

If "first multi-feeding flag=1," that is, if the multi-feeding determination unit 712 determines that multi-feeding has occurred even once (step S26; YES), the control unit 71 writes "0" in the first multi-feeding flag, and "1" in the second multi-feeding flag. Also, the control unit 71 substitutes the number of count values stored in the multi-feeding count-value storage unit 713 into the multi-feeding frequency N (step S27). Referring to FIG. 6, if the multi-feeding count-value storage unit 713 stores the values of "4" and "6," "multi-feeding frequency N=2" is obtained.

Figure 7:
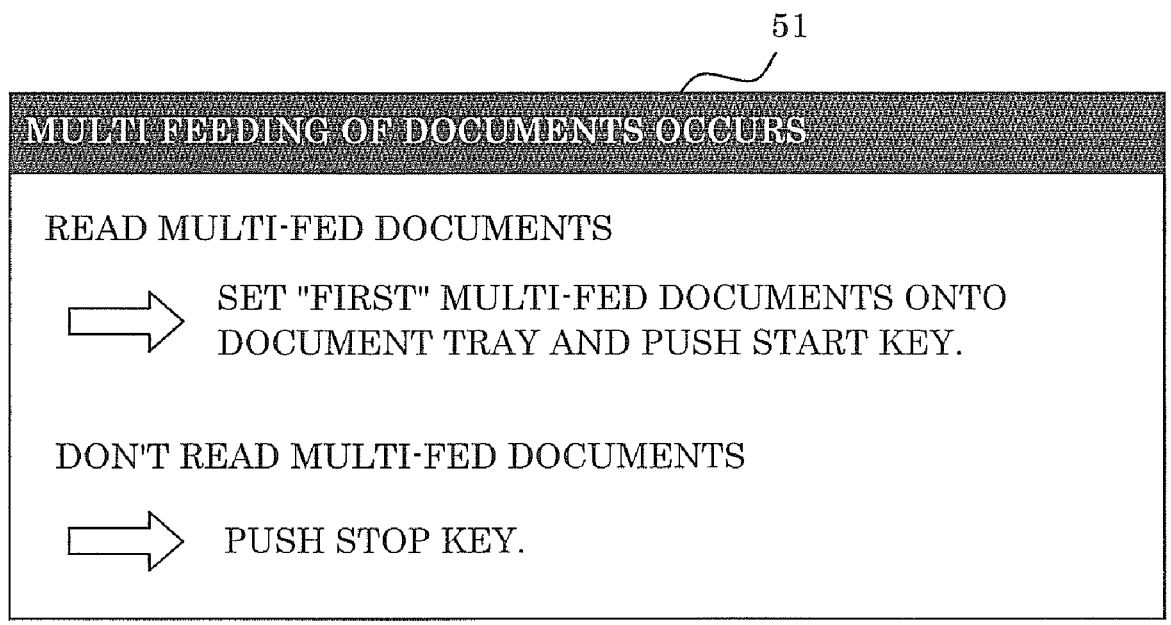
FIG. 7 illustrates an exemplary screen of a display according to the first embodiment of the disclosure.

The display control unit 714 causes the display 51 to display a message screen for notifying the user about the occurrence of multi-feeding (step S28). FIG. 7 illustrates an exemplary message screen displayed on the display 51. The display control unit 714 causes the display 51 to display a message "multi-feeding of documents has occurred," a message that asks the user to set documents subjected to the first multi-feeding onto the document tray 211 and to press the start key 55 if the reading operation for the documents is to be continued, and a message that asks the user to press the stop key 56 if the reading operation for the documents is to be stopped.

In this embodiment, the multi-feeding has occurred two times, for example. Hence, the display control unit 714 causes the display 51 to display a message to "set 'first' multi-fed documents onto document tray . . . . " However, if the multi-feeding occurs only once, the display 51 may display a message to "set documents subjected to multi-feeding onto document tray . . . . "

Figure 8:
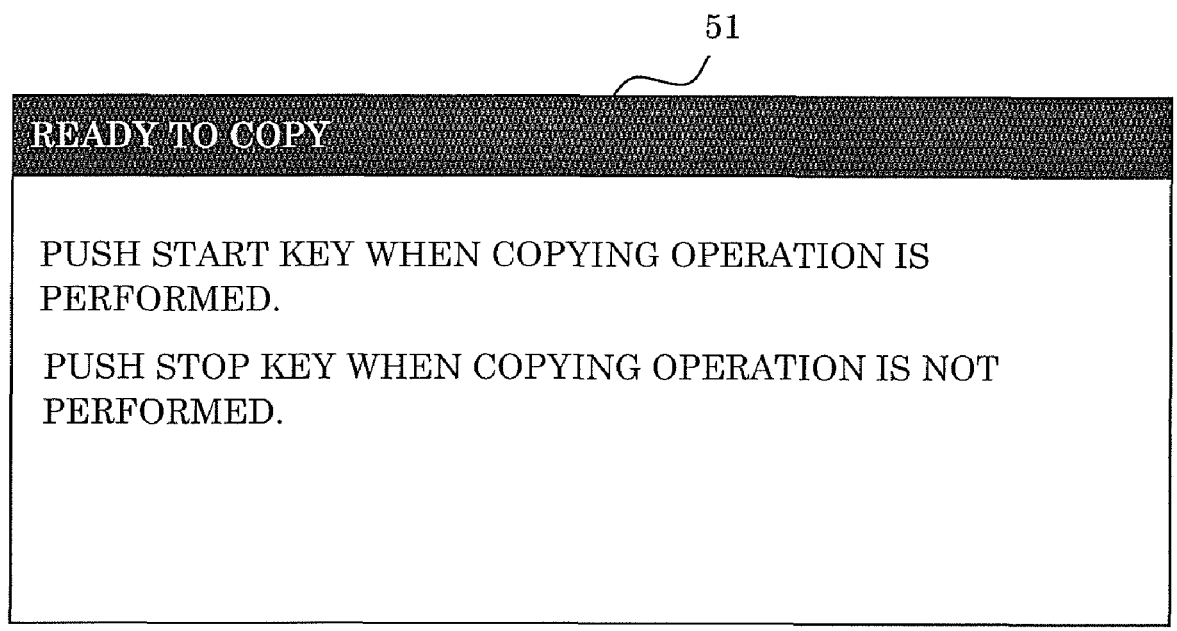
FIG. 8 illustrates an exemplary screen of the display according to the first embodiment of the disclosure.

If the stop key 56 is pressed (step S29; NO, step S30; YES), the display control unit 714 causes the display 51 to display a selection screen that asks the user to select whether the image forming operation is performed depending on the image data stored in the image memory 73 (whether a copying operation is performed) (step S35). FIG. 8 illustrates an exemplary screen that is displayed on the display 51 in step S35. If the user presses the start key 55 (step S35; YES), the control unit 71 causes the image forming unit 40 to perform the image forming operation depending on the image data stored in the image memory 73 (step S36). That is, the documents other than the multi-fed documents are copied. If the user presses the stop key 56 (step S35; NO), the control unit 71 ends the processing without performing the image forming operation.

If the user sets certain documents on the second output tray 255 on the document tray 211, and presses the start key 55 (step S29; YES), the control unit 71 shifts the processing to step S12. That is, the document reading operation for the multi-fed documents is executed. For example, if two documents are multi-fed at the fourth conveyance, and three documents are multi-fed at the sixth conveyance, the user sets the two documents that are multi-fed at the fourth conveyance onto the document tray 211, and presses the start key 55. The image forming apparatus 1 can detect that the multi-feeding of the documents has occurred, however, cannot recognize the number of multi-fed documents. The user finds the multi-fed documents, and places the documents on the document tray 211 every time the multi-feeding occurs.

When the user places the two documents multi-fed at the fourth conveyance onto the document tray 211 and presses the start key 55, the respective conveying rollers, such as the pickup roller 212 and the conveying roller pair 251, convey the documents placed on the document tray 211 one by one to the first conveyance path 261 (step S12). If the registration sensor 256 outputs a detection signal indicative of the passage of each document, the conveyance frequency count unit 711 increments the conveyance frequency K (step S13).

If the multi-feeding determination unit 712 determines that the multi-feeding of the documents does not occur (step S14; NO), the CCD 229 reads images on the documents, and acquires image data (step S15). Since "second multi-feeding flag=1" (step S16; "1"), the control unit 71 stores the image data acquired by the CCD 229 in the multi-feeding image memory 74 (step S18). If the document is present on the document tray 211 (step S25; YES), the control unit 71 shifts the processing to step S12.

In step S14, if the multi-feeding determination unit 712 determines that the multi-feeding of the documents has occurred (step S14; YES), and if "second multi-feeding flag=1" (step S19; YES), the same documents are multi-fed. The documents may be bound by a binding member, such as a staple, glue, or a clip. Thus, the processing from step S20 to step S23 is not performed, and the display control unit 714 causes the display 51 to display an error message (step S24).

Figure 9:
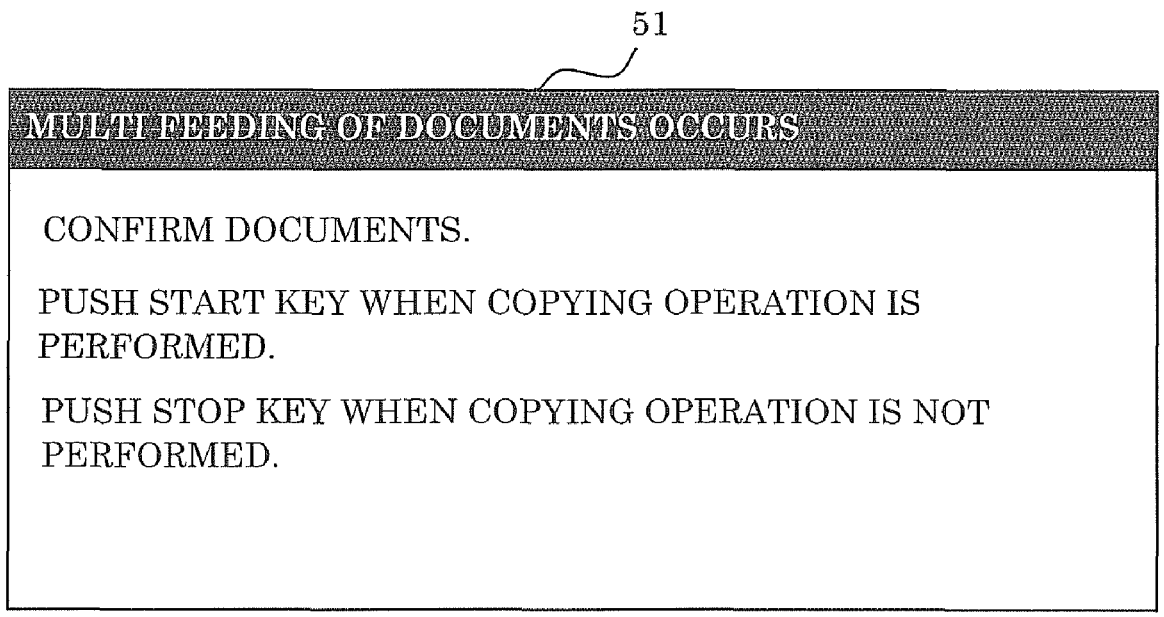
FIG. 9 illustrates an exemplary screen of the display according to the first embodiment of the disclosure.

FIG. 9 illustrates an exemplary screen that is displayed on the display 51. The control unit 71 shifts the processing to step S35. If the user presses the start key 55 (step S35; YES), the control unit 71 causes the image forming unit 40 to perform the image forming operation corresponding to the image data stored in the image memory 73 (step S36). In this embodiment, if the documents, which have been multi-fed during the first image reading operation, are multi-fed again during the second image reading operation, the reading operation is not performed. However, the multi-feeding processing from step S20 to S23 may be repeatedly performed.

Figure 10:
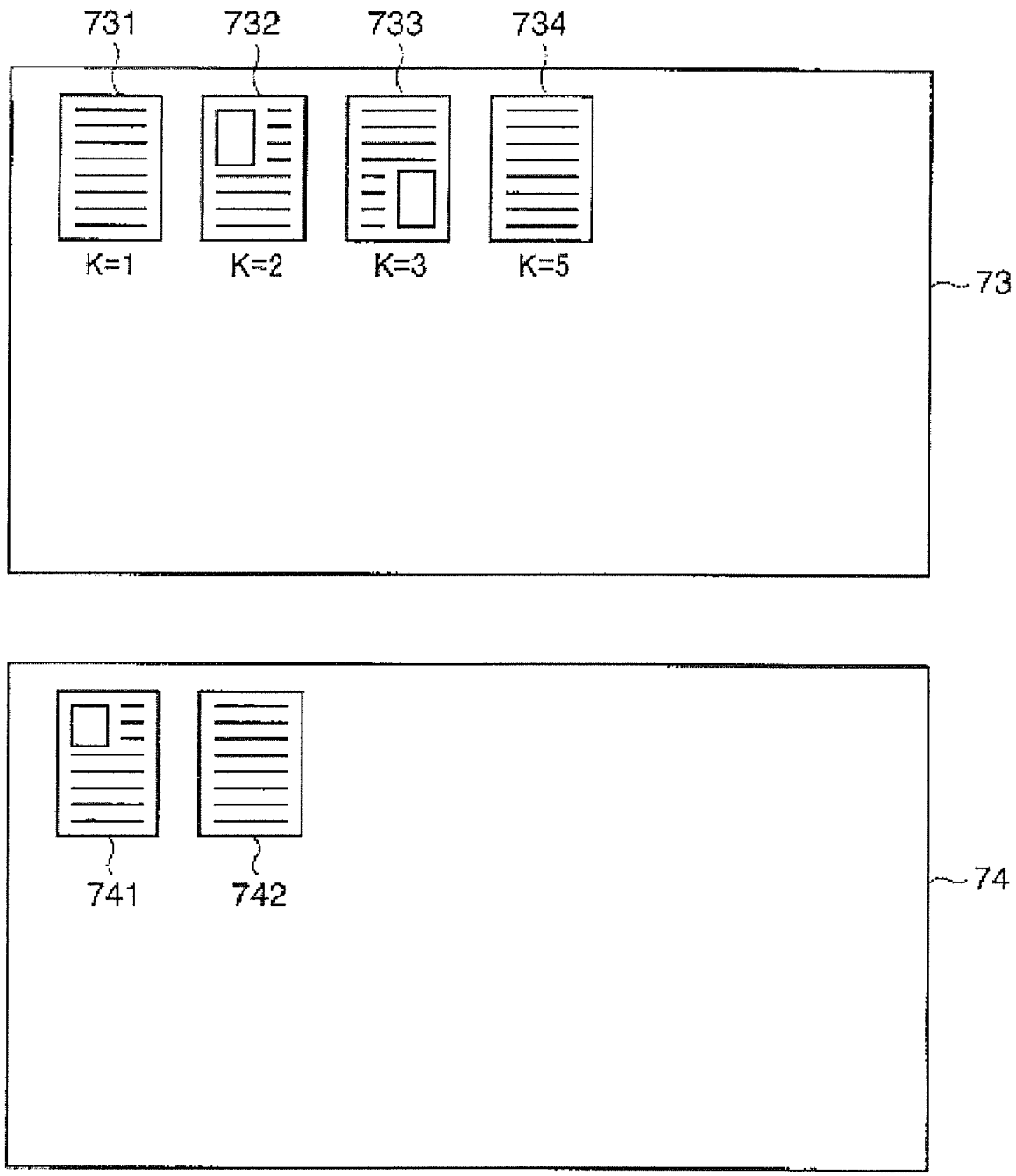
FIG. 10 illustrates an exemplary data configuration of the image memory according to the first embodiment of the disclosure.

FIG. 10 illustrates an exemplary data configuration of the image memory 73 and the multi-feeding image memory 74 when the image reading operation for the two multi-fed documents has ended. The image memory 73 stores image data 731 to 734 and the multi-feeding image memory 74 stores image data 741 and 742 acquired by the CCD 229 during the second image reading operation. That is, the image data 741 and 742 is image data for the multi-fed documents during the first image reading operation.

If the image reading operation of the two multi-fed documents is ended (step S25; NO), and if "first multi-feeding flag=0" and "second multi-feeding flag=1" (step S26; NO, step S31; YES), the control unit 71 inserts the image data (pages) stored in the multi-feeding image memory 74 into correct page positions in the image memory 73 on the basis of the count values stored in the multi-feeding count-value storage unit 713.

Figure 11:
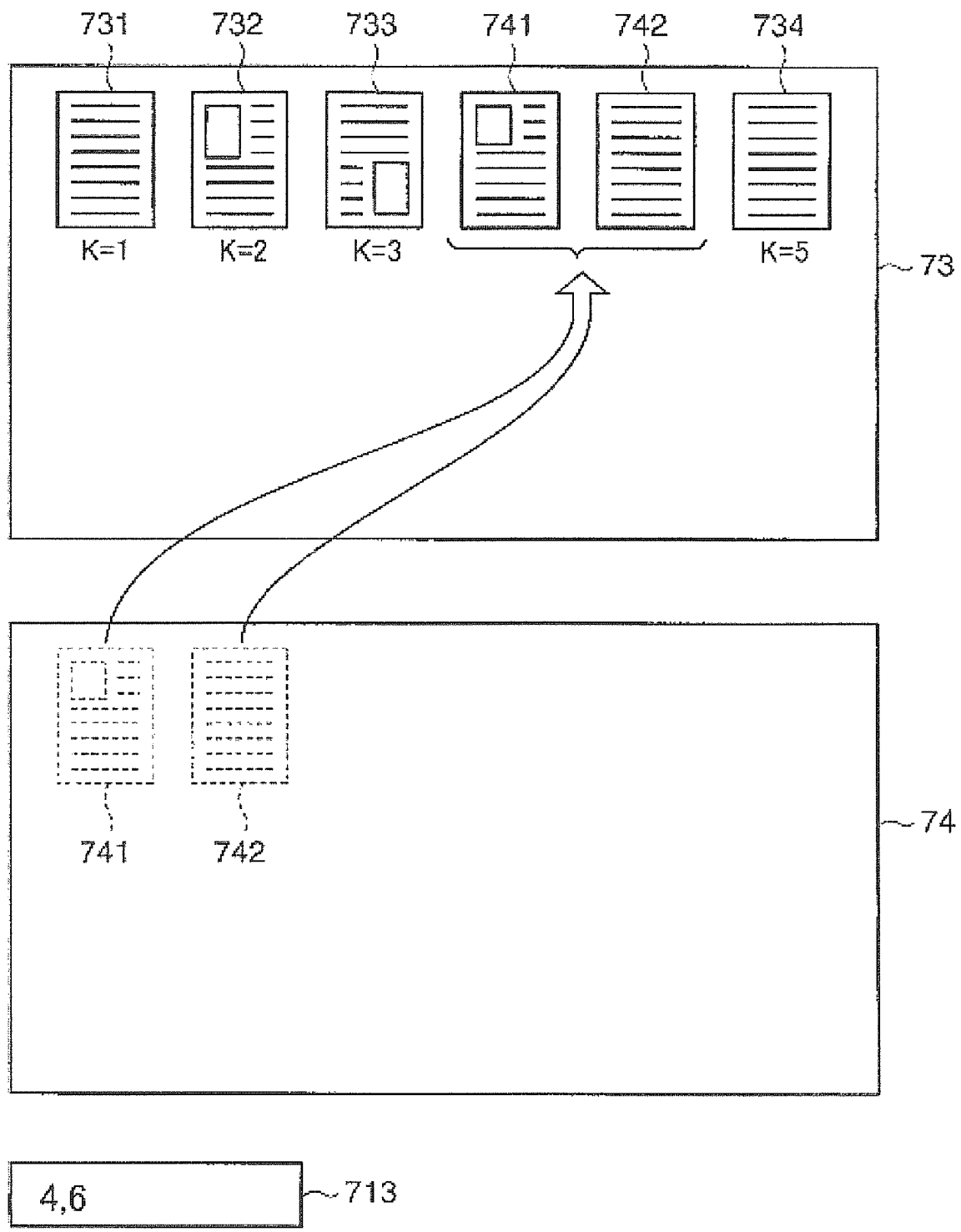
FIG. 11 illustrates an exemplary data configuration of the image memory and the multi-feeding count-value storage unit according to the first embodiment of the disclosure.

Referring to FIG. 11, the insertion processing will be described in detail. The control unit 71 reads the count value stored first in the multi-feeding count-value storage unit 713. In the case of FIG. 11, the count value stored first in the multi-feeding count-value storage unit 713 is "4." The control unit 71 copies all image data stored in the multi-feeding image memory 74 and stores the image data in the image memory 73 at a position next to image data assigned with "K=3," which is a conveyance frequency smaller by 1 than the count value stored first in the multi-feeding count-value storage unit 713, from among image data stored in the image memory 73. Then, the control unit 71 clears the image data stored in the multi-feeding image memory 74.

That is, the image memory 73 stores the image data 741 and 742 between the image data 733 assigned with "K=3" and the image data 734 assigned with "K=5." Accordingly, the image data of the multi-fed documents can be inserted into a position at which image data lacks because the documents were multi-fed during the first image reading operation and hence images on the multi-fed documents were not read.

Referring back to FIG. 4, the control unit 71 decrements the multi-feeding frequency N (step S32). That is, the current value "N=2" becomes "N=1" by the decrement. If "N=0," that is, if all image data of the multi-fed documents are read and the image data in the multi-feeding image memory 74 is moved to the image memory 73 (step S33; YES), the control unit 71 shifts the processing to step S36.

In contrast, if "N=0" is not obtained (step S33; NO), the control unit 71 deletes one count value in the multi-feeding count-value storage unit 713 in order of FIFO (step S34). That is, if the stored content of the multi-feeding count-value storage unit 713 is as shown in FIG. 11, the previously stored value "4" is deleted. Thus, the stored content of the multi-feeding count-value storage unit 713 is only "6."

The control unit 71 shifts the processing to step S28, in which the display control unit 714 causes the display 51 to display a message (step S28). At this time, in particular, the display control unit 714 causes the display 51 to change the exemplary screen in FIG. 7 into a message to "set "second" multi-fed documents onto document tray . . . . "

If the documents are set on the document tray 211 (the conveyance frequency count unit 711 sets the conveyance frequency K to 0), and if the start key 55 is pressed (step S29; YES), the control unit 71 shifts the process to step S12. That is, the control unit 71 executes the reading operation for the documents set on the document tray 211. As mentioned above, since the three documents are multi-fed at the sixth conveyance, the user sets the three documents multi-fed at the sixth conveyance, on the document tray 211 and presses the start key 55. Then, the respective conveying rollers, such as the pickup roller 212 and the conveying roller pair 251, convey the documents placed on the document tray 211 one by one to the first conveyance path 261 (step S12). If the registration sensor 256 outputs a detection signal indicative of the passage of each document, the conveyance frequency count unit 711 increments the conveyance frequency K (step S13).

If the multi-feeding determination unit 712 determines that the multi-feeding of the documents does not occur (step S14; NO), the CCD 229 reads images on the documents and acquires image data (step S15). Since "second multi-feeding flag=1" (step S16; "1"), the control unit 71 stores the image data acquired by the CCD 229 in the multi-feeding image memory 74 (step S18). If the documents are present on the document tray 211 (step S25; YES), the control unit 71 shifts the processing to step S12.

In step S14, if the multi-feeding determination unit 712 determines that the multi-feeding of the documents has occurred (step S14; YES), and if "second multi-feeding flag=1" (step S19; YES), the display control unit 714 causes the display 51 to display an error message (step S24), and the control unit 71 shifts the processing to step S35.

If the image reading operation for the three documents placed on the document tray 211 is ended (step S25; NO), and if "first multi-feeding flag=0" and "second multi-feeding flag=1" (step S26; NO, step S31; YES), the control unit 71 inserts the image data stored in the multi-feeding image memory 74 into the corresponding positions in the image memory 73.

Figure 12:
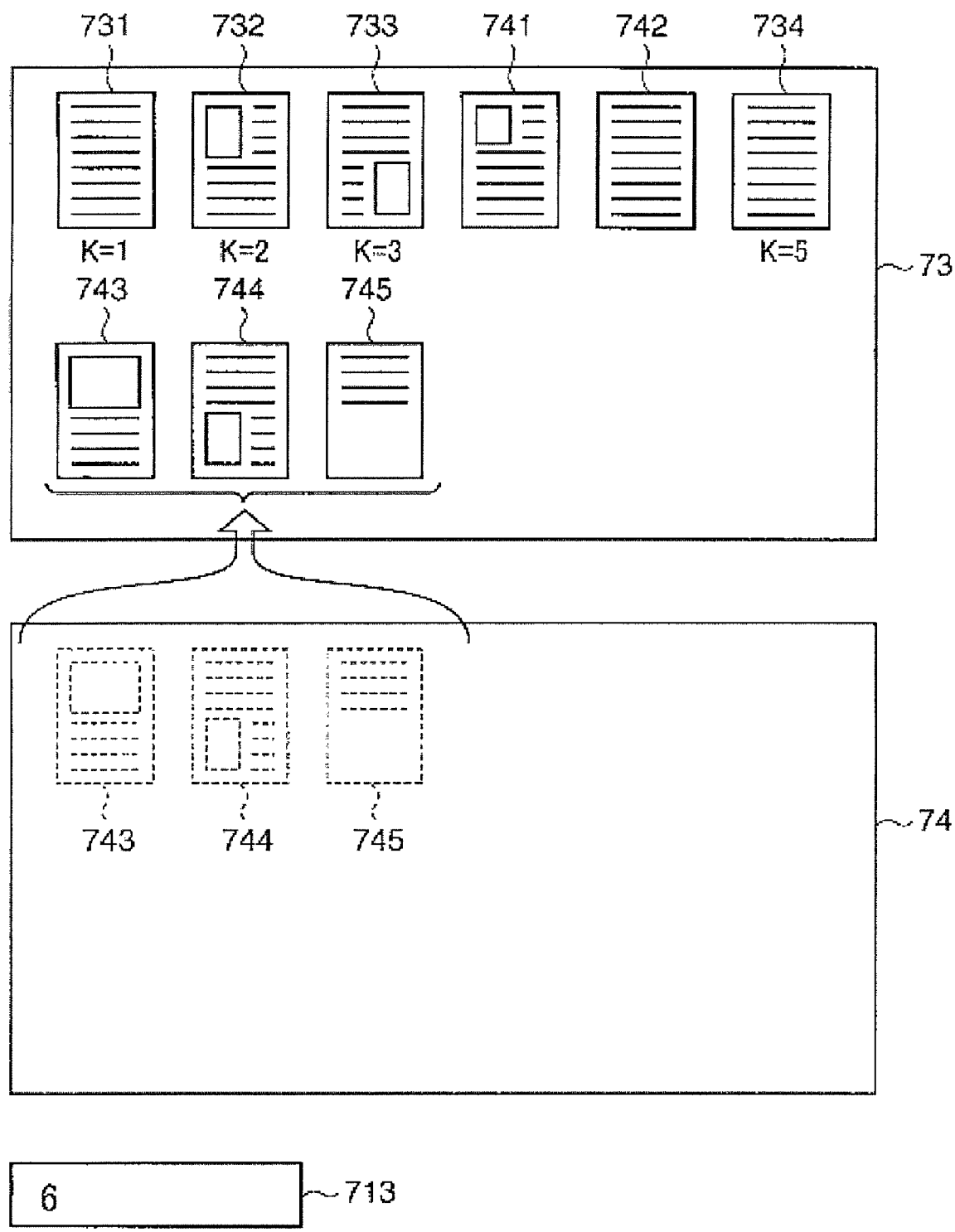
FIG. 12 illustrates an exemplary data configuration of the image memory and the multi-feeding count-value storage unit according to the first embodiment of the disclosure.

Referring to FIG. 12, the insertion processing will be described in detail. The control unit 71 reads a count value stored first in the multi-feeding count-value storage unit 713. In FIG. 12, the count value stored first in the multi-feeding count-value storage unit 713 is "6." The control unit 71 copies all image data stored in the multi-feeding image memory 74 and stores the image data in the image memory 73 at a position next to image data assigned with "K=5," which is a conveyance frequency smaller by 1 than the count value stored first in the multi-feeding count-value storage unit 713, from among image data stored in the image memory 73. Then, the control unit 71 clears the image data stored in the multi-feeding image memory 74. As a result, image data 743 to 745 stored in the multi-feeding image memory 74 is inserted into the image memory 73 at a position next to the image data 734 assigned with "K=5."

Referring back to FIG. 4, the control unit 71 decrements the multi-feeding frequency N (step S32). That is, the multi-feeding frequency, which is currently "N=1," becomes "N=0." If "N=0," in particular, if the reading operation for all multi-fed documents is ended (step S33; YES), the control unit 71 shifts the processing to step S36. The control unit 71 causes the image forming unit 40 to form images on sheets depending on the image data stored in the image memory 73 (step S36), and ends the processing. The description for the flowcharts shown in FIGS. 3 and 4 are thus ended.

In a related art, although multi-feeding of documents has occurred, if a reading operation for remaining documents are continuously performed, a document which does not face the reading window 230 of the scanner unit 22 from among the multi-fed documents may not be read by the scanner unit 22, and printing for that page may be skipped. Also, in an apparatus having a function that automatically stops the conveyance and reading operation of documents if multi-feeding is detected, the user has to perform the reading operation again for the multi-fed documents and the remaining documents. This is troublesome work and takes a time.

Therefore, as described above, if the multi-feeding determination unit 712 determines that the multi-feeding of the documents has occurred, on the basis of the detection signal from the ultrasonic sensor 252, the control unit 71 changes the position of the branch guide 253, to guide the documents in the multi-fed state to the second conveyance path 262, and to output the documents onto the second output tray 255. Thereafter, the reading operation for the remaining documents is continuously performed. The user watches the message displayed on the display 51 and the documents placed on the second output tray 255, and hence can find out that the documents are multi-fed and the documents are not read correctly.

If the user places the multi-fed documents on the document tray 211 and performs the operation for starting again the reading operation for the documents, the control unit 71 causes the multi-feeding image memory 74 to store image data acquired by the CCD 229. Then, the control unit 71 inserts the image data stored in the multi-feeding image memory 74 into the correct page position in the image memory 73 and stores the image data in the image memory 73. In other words, the control unit 71 assigns information of page order of the documents to the image data stored in the image memory 73 and to the multi-feeding image data stored in the multi-feeding image memory 74. Since the image memory 73 stores the image data in page order of the documents, even if the multi-feeding of the documents has occurred, a page in the image data is not skipped or pages in the image data are not disordered in the image memory 73. As described above, the image reading operation for the multi-fed documents can be easily performed.

Further, the multi-fed documents pass through the path branched from the first conveyance path 261 and are output to the second output tray 255 before the documents pass through the CIS 254 or the reading window 230. Accordingly, if the factor of the multi-feeding is a binding member, such as a staple or a clip, the CIS 254 and the reading window 230 can be prevented from being damaged by the binding member.

The present disclosure is not limited to the above-described embodiment, and may be appropriately modified.

Second Embodiment

In the first embodiment, the document conveying unit 21 includes the second conveyance path 262 that is branched from the first conveyance path 261 and is provided downstream of the ultrasonic sensor 252 in the document conveyance direction. Also, if the multi-feeding determination unit 712 determines that the multi-feeding of the documents has occurred, the position of the branch guide 253 is changed to the multi-feeding conveyance position, the multi-fed documents are conveyed to the second conveyance path 262, and the multi-fed documents are output onto the second output tray 255. In a second embodiment, an image forming apparatus 2 is described. The image forming apparatus 2 uses a switch-back conveyance path 263 instead of the second conveyance path through which the multi-fed documents are conveyed, and includes a second output tray 800 provided at an output port of the switch-back conveyance path 263. In this embodiment, the same numerals are used for the components similar to those in the first embodiment, and any redundant descriptions are omitted.

Figure 13:
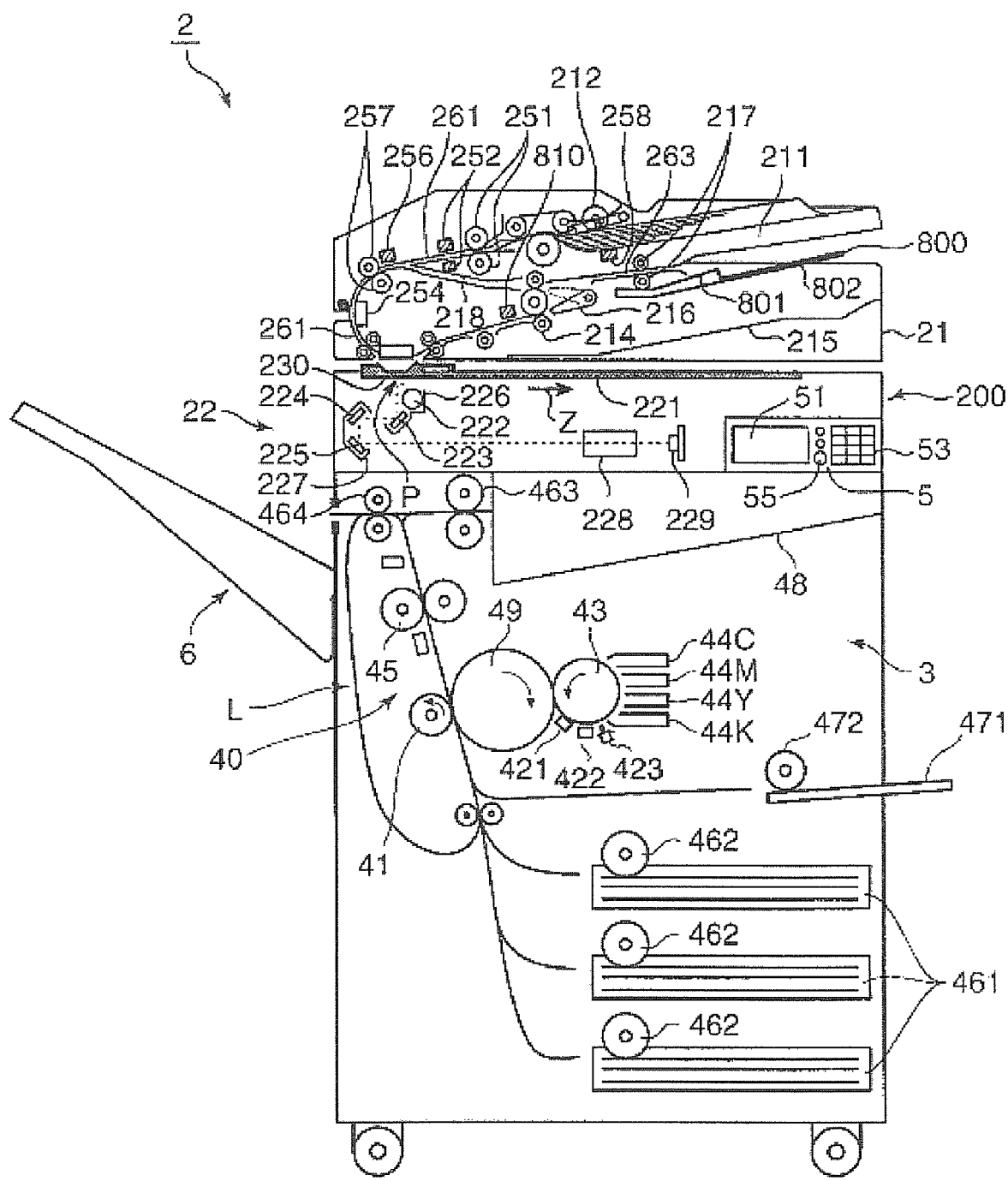
FIG. 13 is a vertical section schematically showing an inner configuration of an image forming apparatus according to a second embodiment of the disclosure.

FIG. 13 is a longitudinal sectional view schematically showing an inner configuration of the image forming apparatus 2 according to this embodiment. The branch guide 253 in the first embodiment corresponds to a switch guide 216 in a document reversal mechanism. The second output tray 800 that receives the multi-fed documents is provided at the output port of the switch-back conveyance path 263. In addition, a sensor 810 that detects the presence of a document is provided upstream of the switch guide 216 of the first conveyance path 261 in the document conveyance direction.

Figure 14A:
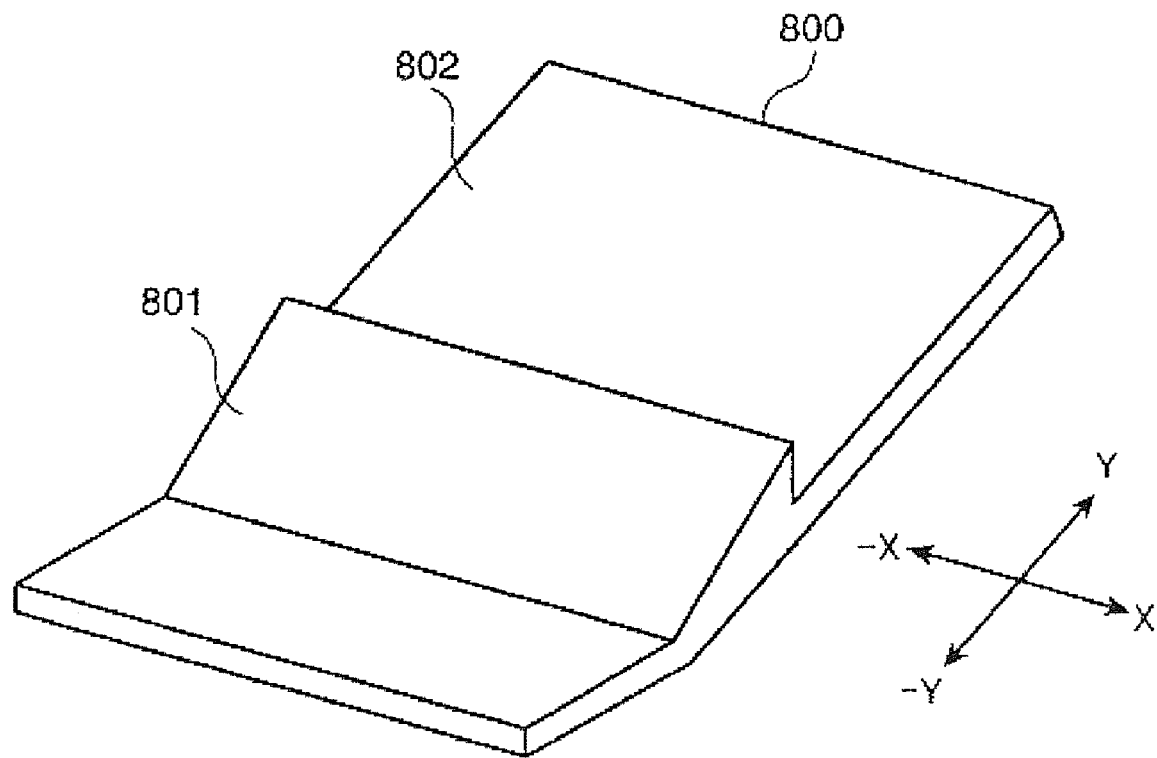
FIG. 14A is a perspective view showing a second output tray according to the second embodiment of the disclosure.
Figure 14B:
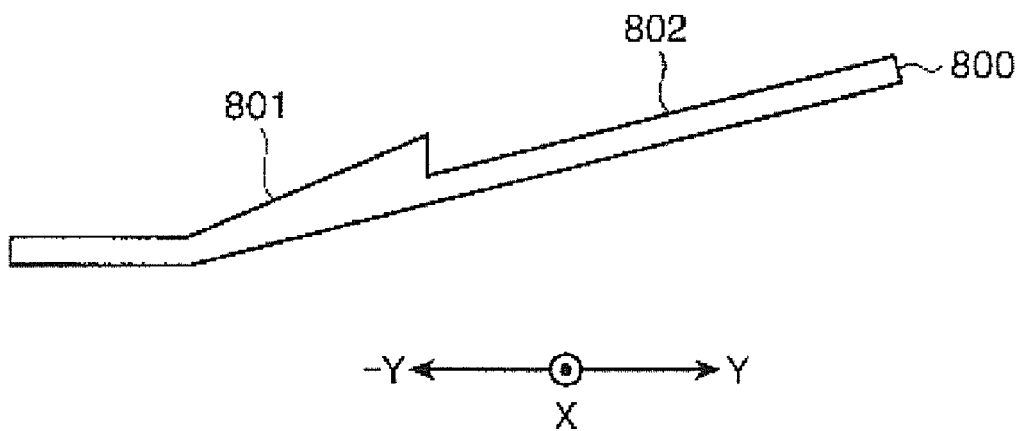
FIG. 14B is a cross section showing the second output tray according to the second embodiment of the disclosure.

FIG. 14A is a perspective view and FIG. 14B is a cross section of the second output tray 800. The second output tray 800 includes a first surface 801 and a second surface 802. The first surface 801 is located at a position near the output port of the switch-back conveyance path 263. The second surface 802 is provided in an output direction (Y direction), in which the documents are output from the switch-back conveyance path 263, such that the first surface 801 is arranged between the output port and the second surface 802. Also, the first surface 801 and the second surface 802 have a step-like shape along the document output direction (Y direction). That is, a step is provided between the first surface 801 and the second surface 802 in the Y direction. The second surface 802 is lower than the first surface 801.

Referring back to FIG. 13, although described above, in the duplex reading mode, if the reading operation for the front side of the document is ended by the CCD 229, the position of the switch guide 216 is changed to the lower side (the position indicated by the solid line), and the document passing through the first conveyance path 261 is sent to the switch-back conveyance path 263. Then, the position of the switch guide 216 is changed to the upper side (the position indicated by the dotted line). The switch-back roller pair 217 nips the document, which has been guided to the switch-back conveyance path 263, while a part of the document is output to the outside of the document conveying unit 21. The switch-back roller pair 217 rotates backward, and switches back the document to the reversal conveyance path 218. The document is fed from the switch-back conveyance path 263 through the reversal conveyance path 218 to the first conveyance path 261. The CCD 229 reads the back side of the document.

In this embodiment, the reversal mechanism is used for outputting multi-fed documents. In particular, if the multi-feeding determination unit 712 determines that the multi-feeding of the documents has occurred on the basis of a detection signal sent from the ultrasonic sensor 252, the control unit 71 changes the position of the switch guide 216 to the lower side (the position indicated by the solid line), so as to guide the documents in the multi-fed state to the switch-back conveyance path 263. Then, the switch-back roller pair 217 outputs the documents in the multi-fed state onto the second surface 802 of the second output tray 800. At this time, the control unit 71 causes the CCD 229 to stop the image reading operation for the multi-fed documents.

In the one-sided reading mode, when the sensor 810 outputs a detection signal resulting from the detection of rear edges of the multi-fed documents, the control unit 71 changes the position of the switch guide 216 to the upper side (the position indicated by the dotted line). In particular, the control unit 71 changes the position of the switch guide 216 to the regular position at the upper side (the position indicated by the dotted line) in the one-sided reading mode so that the documents to be conveyed next are output onto the first output tray 215 after the multi-fed documents pass through the switch guide 216. In the duplex reading mode, the document to be conveyed next has to be switched back, and hence the switch guide 216 may be continuously located at the lower side (the position indicated by the solid line).

Figure 15A:
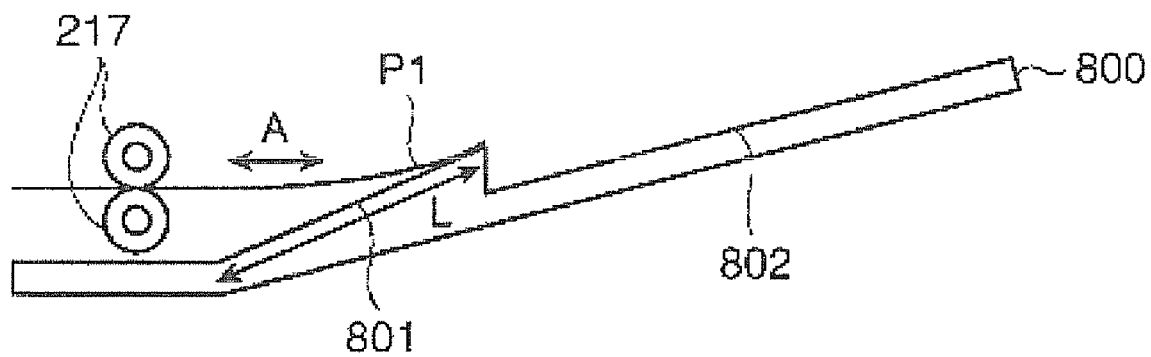
FIG. 15A illustrates a state in which a document is switched back according to the second embodiment of the disclosure.
Figure 15B:
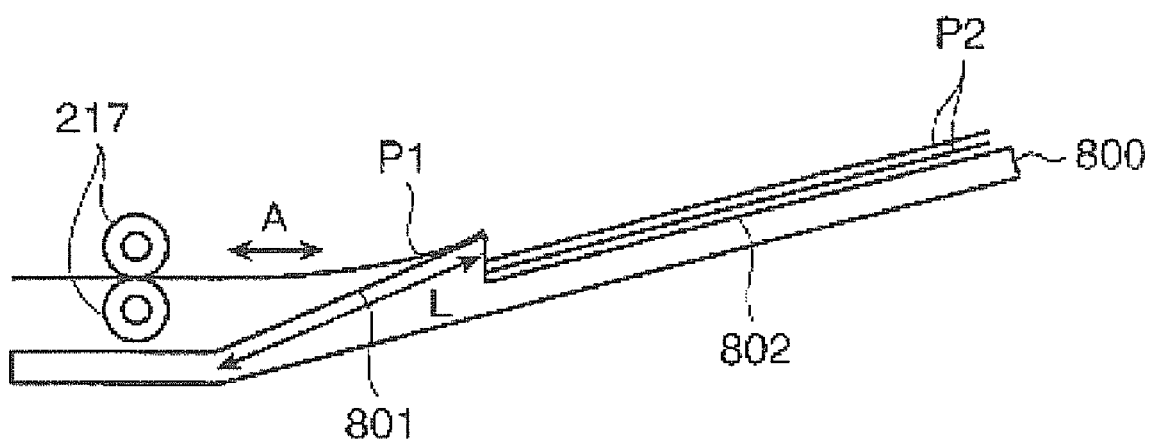
FIG. 15B illustrates a state in which a document is switched back according to the second embodiment of the disclosure.

FIGS. 15A and 15B illustrate states in which a document is switched back. Referring to FIG. 15A, in the duplex reading mode, the switch-back roller pair 217 outputs a part of a document P1 sent to the switch-back conveyance path 263, onto the second output tray 800. Then, the switch-back roller pair 217 rotates backward and causes the document P1 to be switched back to the reversal conveyance path 218. At this time, the first surface 801 receives the part of the output document P1.

Referring to FIG. 15B, multi-fed documents P2 are stacked on the second surface 802. At this time, a motor that drives the switch-back roller pair 217 increases the rotation speed of the switch-back roller pair 217 as compared with a normal rotation speed so that the documents P2 are conveyed over the first surface 801 onto the second surface 802. Since the rotation speed of the switch-back roller pair 217 is increased, the documents P2 are output from the output port of the switch-back conveyance path 263 at a higher speed than a normal speed. The second surface 802 receives the output documents P2. Since the step is formed by the first surface 801 and the second surface 802, the documents P2 placed on the second surface 802 are not moved to the first surface 801.

If the second output tray 800 includes a first surface 801 and a second surface 802 which are not separated from one another, and the second output tray 800 is simply a flat tray, the documents, which have been multi-fed and output, may come into contact with the document, which is partly output during the switch back. At this time, when the document partly output during the switch back is taken into the switch-back conveyance path 263, the documents output on the flat tray may be also taken into the switch-back conveyance path 263 because of friction. This may result in paper jam or reading failure.

Accordingly, by providing the first surface 801 and the second surface 802, the multi-fed documents, which have been output, do not come into contact with the document to be switched back, during the switch back operation. Reading failure of the document or the like therefore does not occur.

The first surface 801 has a length L in the output or conveyance direction (direction indicated by arrow A) of the document P1. The length L may be equivalent to or slightly greater than a sheet length of the document P1 protruding from the output port of the switch-back conveyance path 263 during the switch back. In other words, the length L of the first surface 801 is determined such that the document P1 protruding from the output port of the switch-back conveyance path 263 during the switch back does not reach the second surface 802.

Figure 16:
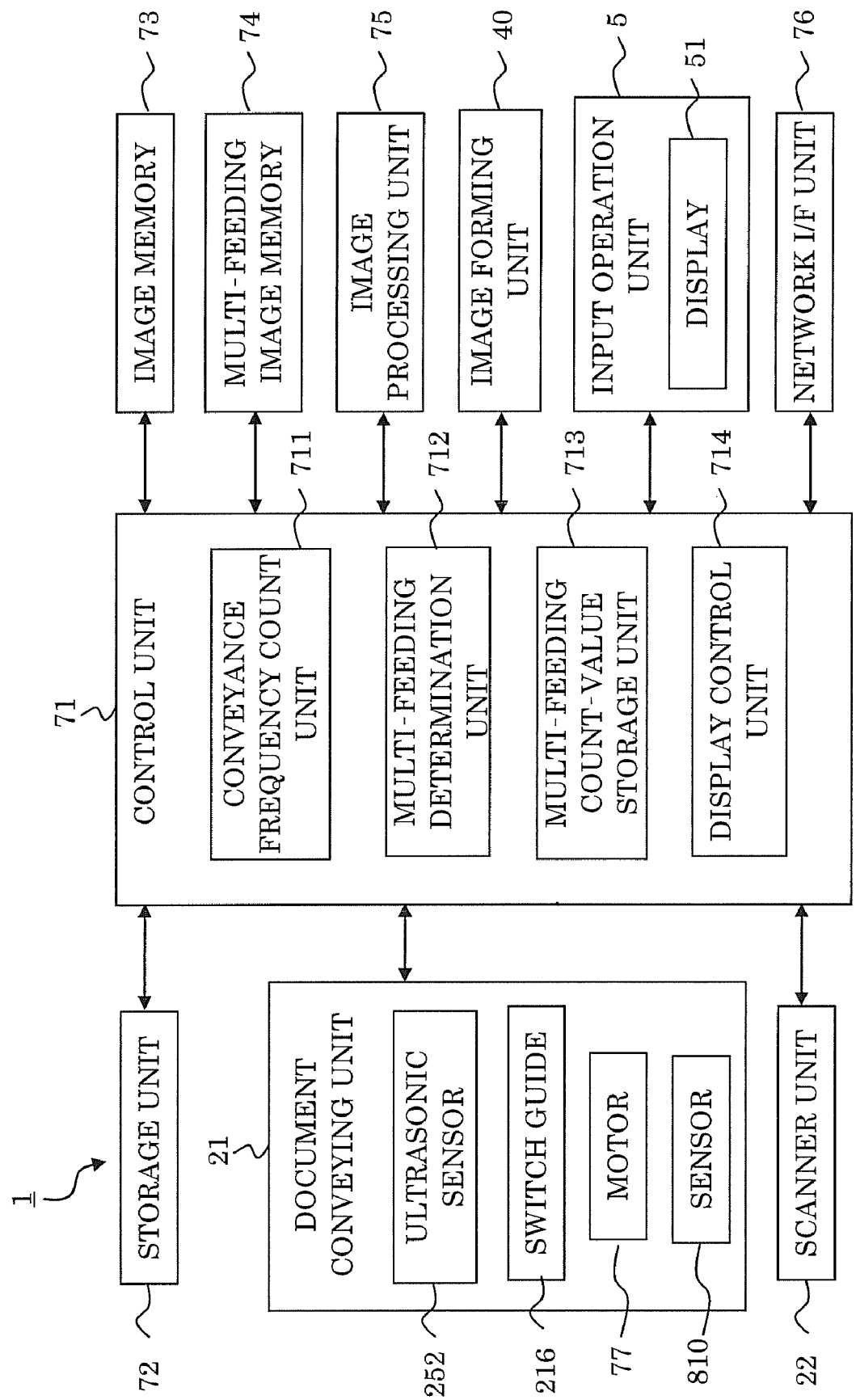
FIG. 16 is a block diagram showing an electrical configuration of the image forming apparatus according to the second embodiment of the disclosure.

FIG. 16 is a block diagram showing an electrical configuration of the image forming apparatus 2 according to the second embodiment. The same numerals are used for the components similar to those of the image forming apparatus 1 described in the first embodiment with reference to FIG. 2, and redundant descriptions are omitted.

A motor 77 of the document conveying unit 21 drives the switch-back roller pair 217. If the multi-feeding determination unit 712 determines that multi-feeding of the documents has occurred on the basis of the detection signal output from the ultrasonic sensor 252, the control unit 71 outputs an instruction signal to the motor 77 to increase the rotation speed of the switch-back roller pair 217 as compared with the normal state. In response to the instruction signal, the motor 77 drives the switch-back roller pair 217 with the increased rotation speed.

The flow of the processing from the image reading operation to the image forming operation in this embodiment is similar to that in the flowcharts in FIGS. 3 and 4 according to the first embodiment, except that "the branch guide" in step S20 and step S23 is changed to "the switch guide," "the multi-feeding conveyance position" in step S20 is changed to "the lower side," and "the registration sensor" in step S22 is changed to "the sensor."

Therefore, as described above, if the multi-feeding determination unit 712 determines that the multi-feeding of the documents has occurred, on the basis of the detection signal from the ultrasonic sensor 252, the control unit 71 controls the position of the switch guide 216, to guide the documents in the multi-fed state to the switch-back conveyance path 263, and to output the documents onto the second output tray 800. Even if the ultrasonic sensor 252 detects the multi-feeding of the documents, the reading operation for the remaining documents are continuously performed. The user watches the message displayed on the display 51 and the documents placed on the second output tray 800, and hence can find out that the documents are multi-fed and the documents are not read correctly.

If the user re-starts the reading operation for the documents, the control unit 71 causes the multi-feeding image memory 74 to store multi-fed image data acquired by the CCD 229. Then, the control unit 71 inserts the multi-fed image data acquired from the multi-fed documents, from among the image data stored in the image memory 73, into the correct page positions and causes the image memory 73 to store the multi-fed image data. Since the image memory 73 stores the image data in page order of the documents, even if multi-feeding of documents has occurred, a page in the image data is not skipped and pages in the image data are not disordered in the image memory 73. As described above, the image reading operation for the multi-fed documents can be easily performed.

Also, since the multi-fed documents are output by using the reversal mechanism for the documents, the multi-fed documents can be sorted without a conveyance path or an output tray. Further, the second output tray 800 includes the first surface 801, which receives the document partly protruding during the switch back, and the second surface 802, on which the multi-fed documents are stacked. Accordingly, a multi-fed document, which has been output during a multi-feed operation, does not come into contact with subsequent non-multi-fed documents, as they are being switched back. Thus, the documents stacked on the second output tray 800 can be prevented from being erroneously taken into the switch-back conveyance path 263 during subsequent image reading operations.

It should be understood that various changes and modifications to the embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. An image reading apparatus, comprising:
   a document tray on which documents to be read are placed;
   first and second output trays onto which the documents to be read may be output;
   a first conveyance path through which the documents to be read are conveyed from the document tray to the first output tray;
   a conveying roller that conveys the documents from the document tray to the first conveyance path;
   a second conveyance path located downstream of the conveying roller in a document conveyance direction and branched from the first conveyance path at a branch point in the first conveyance path, first selected ones of the documents being conveyed to the second output tray through the second conveyance path;
   a switch unit adjacent the branch point and configured to change a conveyance path of the documents between the first conveyance path and the second conveyance path;
   a multi-feed determination unit configured to determine whether the documents are in a multi-fed state;
   a reading unit configured to read and generate first image data from second selected ones of the documents that pass through the first conveyance path;
   an image storage unit configured to store the first image data generated by the reading unit;
   a control unit configured to control the switch unit to (i) change a position of the switch unit such that the second selected ones of the documents are continuously guided through the first conveyance path and to the first output tray when the multi-feed determination unit determines that the documents are not in the multi-fed state, and (ii) change the position of the switch unit such that the first selected ones of the documents are conveyed through the second conveyance path and to the second output tray without being read by the reading unit when the multi-feed determination unit determines that the documents are in the multi-fed state; and
   a multi-fed image storage unit configured to store second image data, generated by the reading unit after reading second image data from the first selected ones of the documents image data, after the reading of the second selected ones of the documents has completed,
   wherein the control unit is further configured to assign information of page order of the second selected ones of the documents to the image data stored in the image storage unit.

2. The image reading apparatus according to claim 1, further comprising:
   a count unit configured to count the number of times that the conveying roller conveys the documents placed on the document tray to the first conveyance path, and outputs count values; and
   a multi-feed count-value storage unit configured to store the corresponding count value output by the count unit each time the multi-feed determination unit determines that the documents are in the multi-fed state.

3. The image reading apparatus according to claim 2,
   wherein the image storage unit is further configured to store the corresponding count value output by the count unit for each image in the first image data.

4. The image reading apparatus according to claim 3, wherein the control unit detects an image from the first image data with a count value that is smaller by 1 than a next count value stored in the multi-feed count-value storage unit, and inserts the second image data stored in the multi-fed image storage unit to a position next to the detected image, so that a correct storage order of the first image data and the second image data is maintained, corresponding to an original order of the documents.

5. The image reading apparatus according to claim 3, wherein the multi-feed count-value storage unit is a storage unit of a first-in first-out (FIFO) type.

6. The image reading apparatus according to claim 1, further comprising:
   a display; and
   a display control unit that performs display control for the display,
   wherein, when the multi-feed determination unit determines that the documents are in the multi-fed state, the display control unit causes a corresponding notification that multi-feeding has occurred to be displayed on the display.

7. The image reading apparatus according to claim 6, wherein, after the second selected ones of the documents have been read by the reading unit, the display control unit causes a message for an instruction to move the first selected ones of the documents, which have been multi-fed and output to the second output tray, to the document tray.

8. The image reading apparatus according to claim 7, wherein, during re-conveying of the first selected ones of the documents moved again to the document tray, if the multi-feed determination unit determines again that the first selected ones of the documents are multi-fed, the display control unit causes the display to display an error message.

9. The image reading apparatus according to claim 1, wherein the branch point between the first conveyance path and the second conveyance path is located downstream of the conveying roller in the document conveyance direction, and upstream of the reading unit in the document conveyance direction.

10. The image reading apparatus according to claim 1, wherein the branch point between the first conveyance path and the second conveyance path is located downstream of the reading unit in the document conveyance direction.

11. The image reading apparatus according to claim 10, further comprising:
    a switch-back roller provided in the second conveyance path, configured such that when a part of a document protrudes from the switch-back roller towards the second output tray, the switch-back roller rotates backward and causes the document to be switched back; and
    a reversal conveyance path branched from the second conveyance path and joined with the second conveyance path at a position located upstream of the reading unit in the document conveyance direction, the switched back document passing through the reversal conveyance path so that the reading unit reads an image on a back side of the document,
    wherein, when the multi-feed determination unit determines that the documents are in the multi-fed state, the control unit changes the position of the switch unit such that the first selected ones of the documents are conveyed to the second conveyance path, and the switch-back roller fully outputs the first selected ones of the documents to the second output tray.

12. The image reading apparatus according to claim 11, wherein the second output tray includes a first surface located near an output of the switch-back roller, and a second surface located adjacent the first surface in a document output direction such that the first surface is arranged between the output and the second surface, the first surface and the second surface being divided by a step-like shape along the document output direction.

13. The image reading apparatus according to claim 12, wherein the second surface is lower than the first surface.

14. An image forming apparatus, comprising:
an image reading apparatus including,
- a document tray on which documents to be read are placed;
- first and second output trays onto which the documents to be read may be output;
- a first conveyance path through which the documents to be read are conveyed from the document tray to the first output tray;
- a conveying roller that conveys the documents from the document tray to the first conveyance path;
- a second conveyance path located downstream of the conveying roller in a document conveyance direction and branched from the first conveyance path at a branch point in the first conveyance path, first selected ones of the documents being conveyed to the second output tray through the second conveyance path;
- a switch unit adjacent the branch point and configured to change a conveyance path of the documents between the first conveyance path and the second conveyance path;
- a multi-feed determination unit configured to determine whether the documents are in a multi-fed state;
- a reading unit configured to read and generate first image data from second selected ones of the documents that pass through the first conveyance path;
- an image storage unit configured to store the first image data generated by the reading unit;
- a control unit configured to control the switch unit to (i) change a position of the switch unit such that the second selected ones of the documents are continuously guided through the first conveyance path and to the first output tray when the multi-feed determination unit determines that the documents are not in the multi-fed state, and (ii) change the position of the switch unit such that the first selected ones of the documents are conveyed through the second conveyance path and to the second output tray without being read by the reading unit when the multi-feed determination unit determines that the documents are in the multi-fed state; and
- a multi-fed image storage unit configured to store second image data, generated by the reading unit after reading second image data from the first selected ones of the documents image data, after the reading of the second selected ones of the documents has completed,
wherein the control unit is further configured to assign information of page order of the second selected ones of the documents to the image data stored in the image storage unit; and
an image forming unit that forms images on sheets depending on the image data stored in the image storage unit.

15. The image forming apparatus according to claim 14, further comprising:
a display; and
a display control unit that performs display control for the display,
wherein, when the multi-feed determination unit determines that the documents are in the multi-fed state, the display control unit causes a corresponding notification that multi-feeding of documents has occurred to be displayed on the display.

16. The image forming apparatus according to claim 15, wherein, after the second selected ones of the documents have been read by the reading unit, the display control unit causes a message for an instruction to move the first selected ones of the documents, which have been multi-fed and output to the second output tray, to the document tray.

17. The image forming apparatus according to claim 16, wherein, during re-conveying of the first selected ones of the documents moved again to the document tray, if the multi-feed determination unit determines again that the first selected ones of the documents are multi-fed, the display control unit causes the display to display an error message.

18. A method of scanning a plurality of documents from a document tray, the method comprising:
- conveying a first subset of the documents, which have not been detected to have been multi-fed, from the document tray, through a first conveyance path, past an image reading unit, and to a first output tray;
- conveying a second subset of the documents, which have been detected to have been multi-fed, from the document tray, through a second conveyance path and to a second output tray;
- storing first image data of the first subset of documents in an image memory with corresponding page count information identifying each page in the first image data; and
- storing count data, identifying a count corresponding to when the multi-fed second subset of the documents were conveyed, in a multi-feed count-value storage unit.

19. The method of claim 18, further comprising:
after the first subset of the documents have been output to the first output tray and the second subset of documents have been output to the second output tray, displaying a notification to move the second subset of documents, which have been multi-fed and output to the second output tray, to the document tray.

20. The method of claim 19, further comprising, after the second subset of documents have been scanned to second image data:
detecting an image from the first image data with a count value that is smaller by 1 than a next count value stored in the multi-feed count-value storage unit, and inserting the second image data to a position next to the detected image, so that a correct storage order of the first image data and the second image data is maintained, corresponding to an original order of the plurality of documents.

* * * * *